United States Patent
Davila et al.

(10) Patent No.: US 11,653,809 B2
(45) Date of Patent: May 23, 2023

(54) FLOOR CLEANER

(71) Applicant: Techtronic Cordless GP, Anderson, SC (US)

(72) Inventors: Rafael Davila, Kannapolis, NC (US); Robert McRorie, Huntersville, NC (US); Yogeshwar Sookdeo, Archdale, NC (US)

(73) Assignee: Techtronic Floor Care Technology Limited, Tortola (VG)

( * ) Notice: Subject to any disclaimer, the term of this patent is extended or adjusted under 35 U.S.C. 154(b) by 142 days.

(21) Appl. No.: 17/131,147

(22) Filed: Dec. 22, 2020

(65) Prior Publication Data

US 2021/0251455 A1  Aug. 19, 2021

Related U.S. Application Data

(60) Provisional application No. 62/975,982, filed on Feb. 13, 2020.

(51) Int. Cl.
*A47L 11/40* (2006.01)
*B01D 45/08* (2006.01)

(52) U.S. Cl.
CPC ....... *A47L 11/4016* (2013.01); *A47L 11/4027* (2013.01); *A47L 11/4077* (2013.01); *B01D 45/08* (2013.01)

(58) Field of Classification Search
CPC ............. A47L 11/4016; A47L 11/4027; A47L 11/4077; A47L 7/0023; A47L 11/201; A47L 11/30; A47L 7/0004; B01D 45/08
See application file for complete search history.

(56) References Cited

U.S. PATENT DOCUMENTS

| | | |
|---|---|---|
| 4,183,116 A | 1/1980 | Thompson |
| 6,565,637 B2 | 5/2003 | Alberts, III et al. |
| 6,993,807 B2 | 2/2006 | Courtney |
| 7,028,369 B2 | 4/2006 | Park et al. |
| 8,732,898 B2 | 5/2014 | Fry et al. |
| 9,155,435 B2 | 10/2015 | Maeda et al. |
| 9,192,270 B2 | 11/2015 | Westbrook et al. |
| 9,609,986 B2 | 4/2017 | Dimbylow et al. |
| 9,962,052 B2 | 5/2018 | Conrad |
| 10,271,703 B2 | 4/2019 | Tran et al. |
| 10,327,615 B2 | 6/2019 | Huang et al. |
| 2006/0288671 A1 | 12/2006 | Oh et al. |
| 2009/0094786 A1 | 4/2009 | Krebs |
| 2012/0311811 A1 | 12/2012 | Hollis et al. |
| 2015/0320271 A1 | 11/2015 | Dimbylow et al. |
| 2017/0209013 A1 | 7/2017 | Cho |

(Continued)

FOREIGN PATENT DOCUMENTS

| | | |
|---|---|---|
| CN | 108742304 A | 11/2018 |
| FR | 2844697 A1 | 3/2004 |

OTHER PUBLICATIONS

International Search Report and Written Opinion for Application No. PCT/US2020/066677 dated Mar. 17, 2021 (13 pages).

*Primary Examiner* — David Redding
(74) *Attorney, Agent, or Firm* — Michael Best & Friedrich LLP

(57) ABSTRACT

A floor cleaner including a including a base, an upright portion, and a recovery tank. The recovery tank includes a baffle configured to separate liquid and air from a liquid-laden stream entering the recovery tank.

41 Claims, 20 Drawing Sheets

(56) References Cited

U.S. PATENT DOCUMENTS

| | | |
|---|---|---|
| 2019/0059666 A1 | 2/2019 | Gierer et al. |
| 2019/0059673 A1 | 2/2019 | Tran et al. |
| 2019/0159646 A1* | 5/2019 | Luyckx ................ A47L 7/0004 |
| 2019/0174986 A1 | 6/2019 | Conrad |
| 2019/0231159 A1 | 8/2019 | Tran |
| 2019/0298136 A1 | 10/2019 | Yiu et al. |
| 2020/0000303 A1* | 1/2020 | Rukavina .............. A47L 7/0023 |

\* cited by examiner

US 11,653,809 B2

FLOOR CLEANER

CROSS-REFERENCE TO RELATED APPLICATIONS

This application claims priority to U.S. Provisional Application No. 62/975,982, filed Feb. 13, 2020, the entire contents of which are hereby incorporated by reference herein.

BACKGROUND

The present invention relates to floor cleaners.

SUMMARY

In one embodiment a floor cleaner is disclosed including a fluid flow path extending from a dirty air inlet to a clean air outlet, a fluid flow motor positioned in the fluid flow path, a recovery tank positioned in the fluid flow path, and a baffle including a baffle wall. The recovery tank has a top portion, a bottom portion, and a sidewall extending between the top portion and the bottom portion. The recovery tank is configured to receive liquid-laden air from the dirty air inlet through a recovery tank inlet forming an inlet passageway in fluid communication with the dirty air inlet and a recovery tank outlet in fluid communication with the clean air outlet. The baffle is surrounds a baffle axis. The baffle wall has an upper end and a lower end opposite the upper end. The baffle is aligned with the inlet passageway. The inlet passageway is configured to direct a stream of liquid-laden air against the baffle wall directing a first portion of the liquid circumferentially around the baffle in a clockwise direction and a second portion in a counter clockwise direction to separate the liquid from the air.

Other aspects of the invention will become apparent by consideration of the detailed description and accompanying drawings.

BRIEF DESCRIPTION OF THE DRAWINGS

FIG. 6a is a right side view of the recovery tank of FIG. 4a.

FIG. 7a is a left side view of the recovery tank of FIG. 4a.

FIG. 7b is a left side view of the recovery tank of FIG. 4a.

FIG. 8a is a cross-sectional view of the recovery tank of FIG. 4a.

Figure 1:
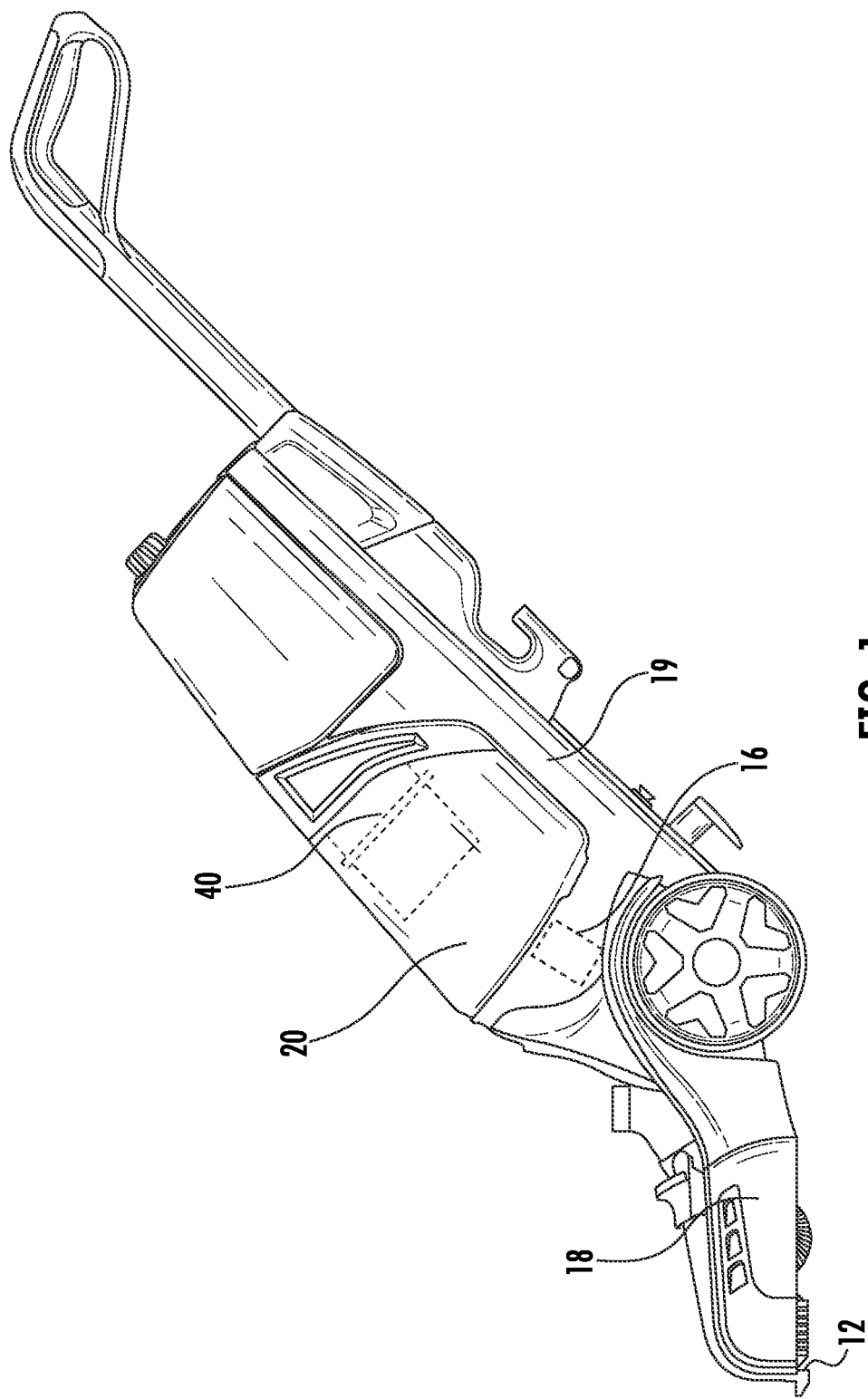
FIG. 1 is a perspective view of a floor cleaner according to one embodiment shown with an upright portion in an inclined use position.
Figure 1A:
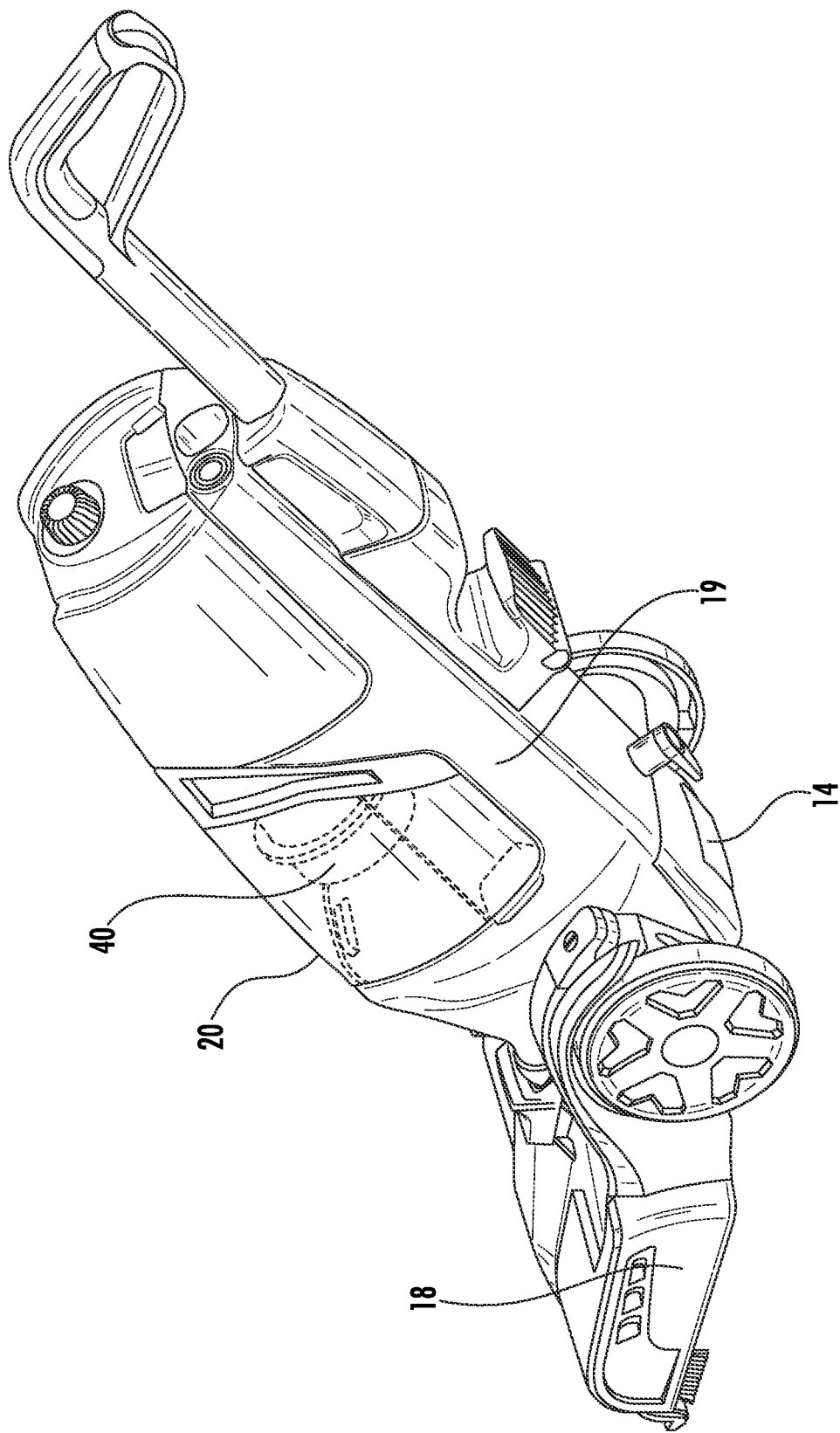
FIG. 1a is an alternative perspective view of the floor cleaner of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

The disclosure relates to a floor cleaner 10 having a liquid recovery system including a suction source provided to draw liquid-laden air from a dirty air inlet, such as a suction nozzle, along a fluid flow path to a recovery tank. The recovery tank is configured with an air/liquid separator having a baffle configured to separate recovered liquid, such as water or other cleaning solution, from the liquid-laden air entering the recovery tank and retaining the separated liquid in the in the recovery tank.

An illustrated embodiment of the floor cleaner 10 includes a base 18, an upright portion 19, and a recovery tank 20. The base 18 may be mounted to or coupled with the upright portion 19 and adapted for movement across a surface to be cleaned. The upright portion 19 is movable between an upright storage position and an inclined use position. The floor cleaner 10 includes a fluid flow path extending from a dirty air inlet 12 to a clean air outlet 14 and a fluid flow motor 16 positioned in the fluid flow path. In other embodiments, the floor cleaner is a canister style cleaner, or may be a portable extractor such as a spot cleaner.

Figure 3:
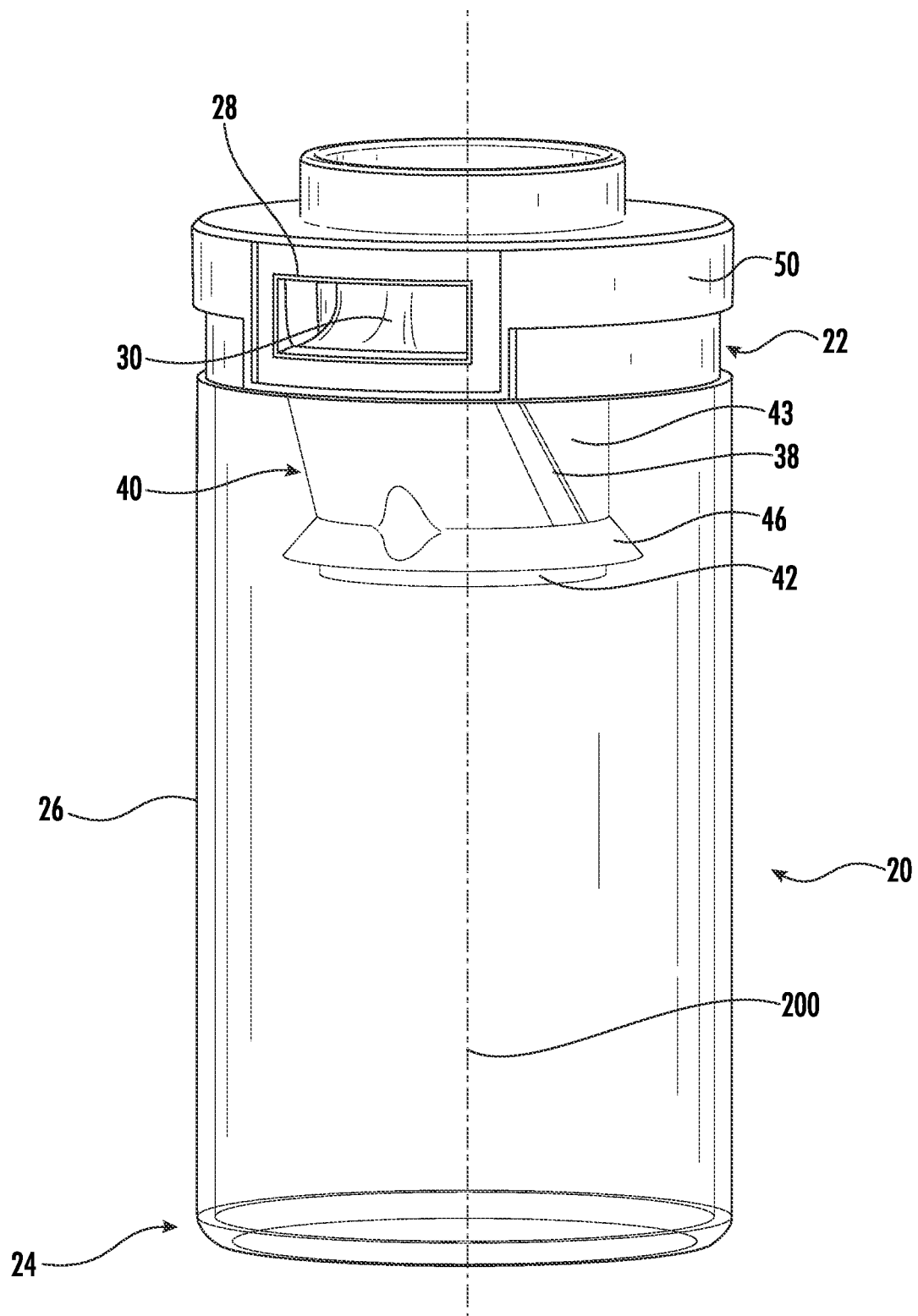
FIG. 3 is a perspective view of a recovery tank according to one embodiment shown having a transparent recovery tank sidewall.

The recovery tank 20 is positioned in the fluid flow path in communication with the dirty air inlet 12. As shown in FIG. 3, the recovery tank 20 includes a top portion 22, a bottom portion 24, and a sidewall 26 extending between the top portion 22 and the bottom portion 24. The sidewall 26 defines a central axis 200 extending between the top portion 22 and the bottom portion 24. The recovery tank 20 is configured to receive liquid-laden air through a recovery tank inlet 28 forming an inlet passageway 30 in fluid communication with the dirty air inlet 12. The recovery tank may include a lid assembly 50 removably coupled to the recovery tank 20 covering an access opening in the recovery tank. The lid assembly 50 is removably coupled to the recovery tank 20 such that the lid assembly 50 is removable to empty the recovery tank 20 through the access opening. In one embodiment, the top portion 22 of the recovery tank has an access opening and the lid assembly is removably coupled to the top portion 22.

Figure 2:
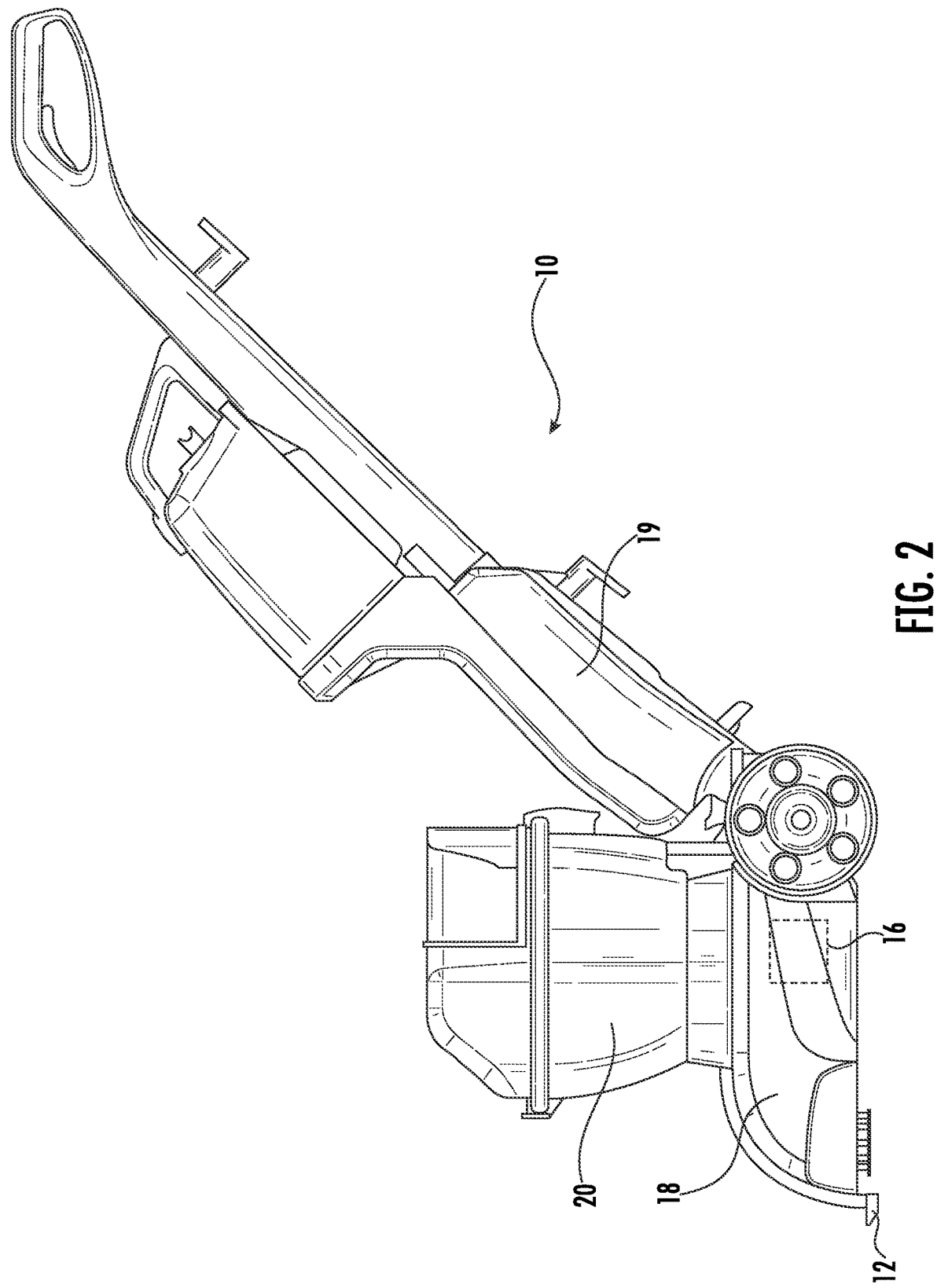
FIG. 2 is a left side view of a floor cleaner according to another embodiment shown with an upright portion in an inclined use position.
Figure 2A:
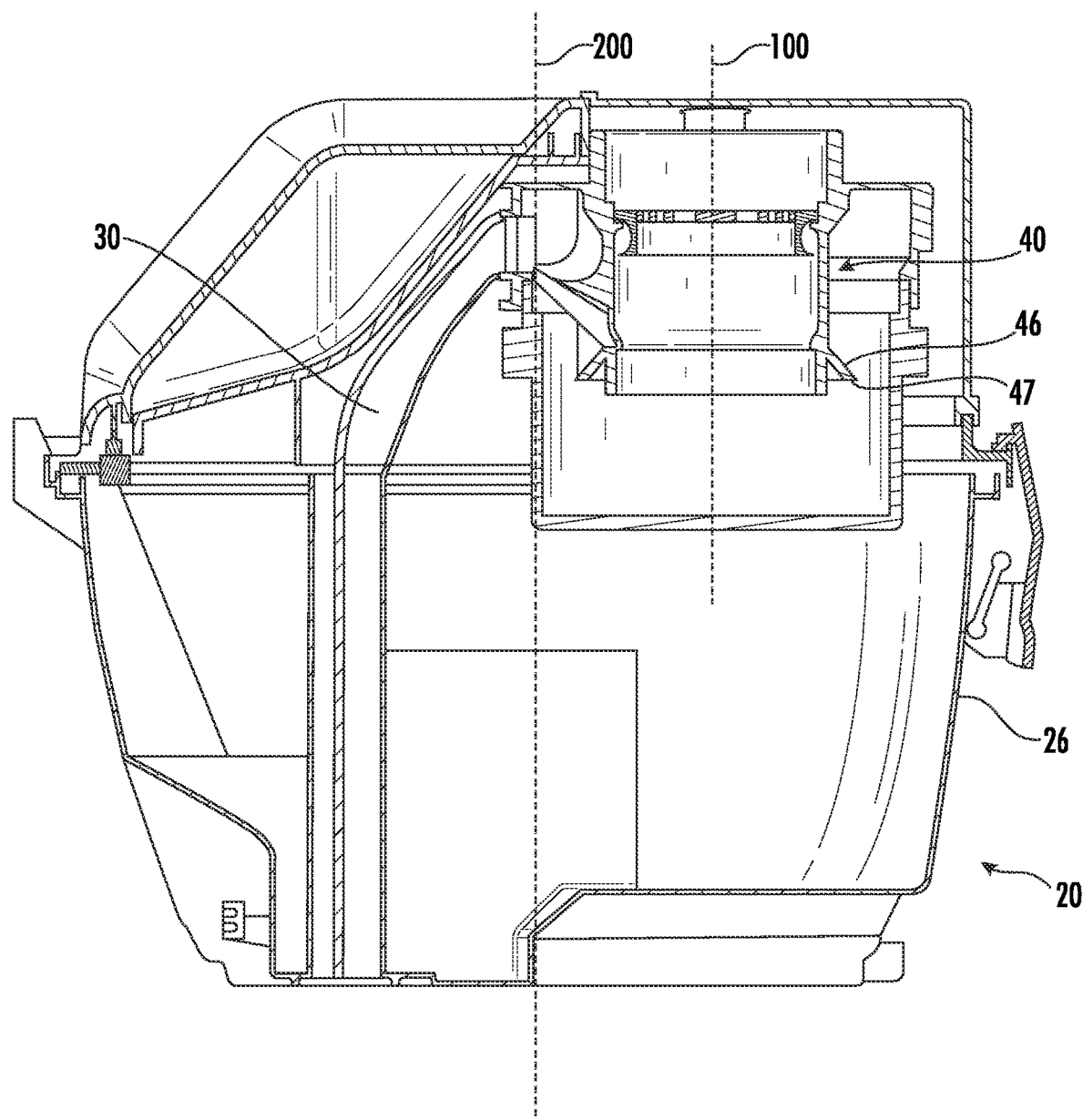
FIG. 2a is a detail cross-section of the recovery tank of FIG. 2.
Figure 8:
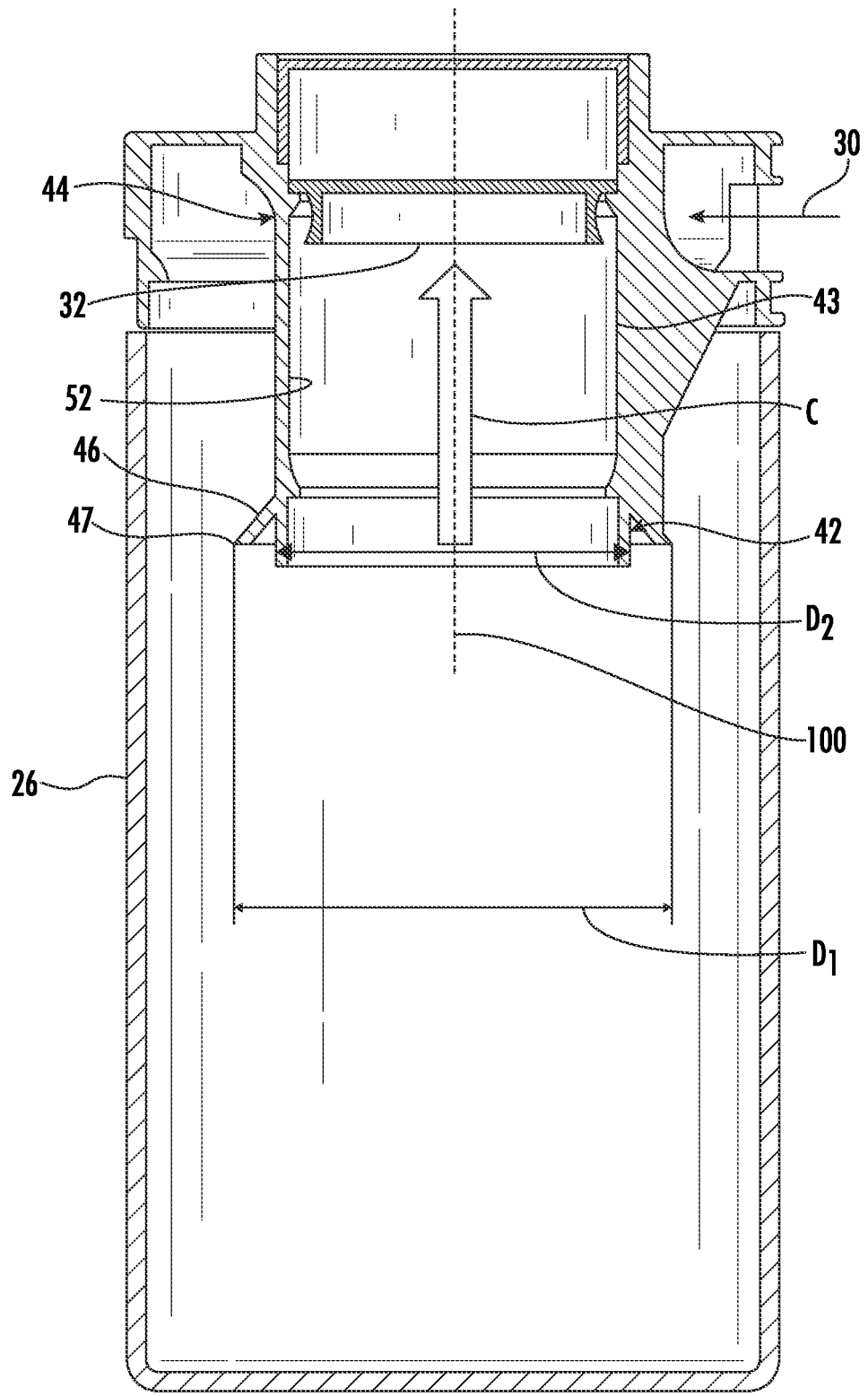
FIG. 8 is a cross-sectional view of the recovery tank of FIG. 4 taken along line VIII of FIG. 4.

The recovery tank 20 includes an air and liquid separator for separating the liquid (i.e. recovered cleaning solution) from the liquid-laden air entering the recovery tank 20 and recovering the separated liquid in the in the recovery tank 20. The separator includes a baffle 40. The baffle 40 includes an upper end 44 (FIG. 8), a lower end 42 opposite the upper end 44, and a baffle wall 43 extending between the upper end 44 and the lower end 42. The baffle 40 is formed about a baffle axis 100 (FIG. 8), the baffle axis 100 extending in a direction from the bottom portion 24 to the top portion 22. The baffle wall 43 is configured to surround the baffle axis 100. In the embodiment illustrated in FIGS. 8 and 8a, the baffle axis 100 is coaxial with the central axis 200; however, the baffle axis 100 does not have to be coaxial with the central axis 200. In the embodiment illustrated in FIG. 2a, the baffle axis 100 is offset from the central axis 200 such that the baffle 40 is still contained within the recovery tank 20, but is not positioned around the central axis 200. The baffle wall 43 may include a cylindrical portion between the upper end 44 and the lower end 42 (FIG. 8) or, as further discussed below, the baffle wall 43 may include a frusto-conical portion (FIG. 8b). In one embodiment, the baffle wall 43 may include a polygonal portion surrounding the baffle axis 100. The recovery tank 20 may be coupled to the upright portion 19 of the cleaner such that the baffle wall 43 is inclined in use, as shown in FIG. 1, or may be coupled to the base 18 such that the baffle wall 43 is upright in use as shown in FIG. 2.

The baffle 40 is aligned with the inlet passageway 30 such that the flow of air and liquid coming into the recovery tank 20 is directed onto the baffle wall 43. The baffle 40 is configured to turn the air and liquid from the inlet passageway 30 circumferentially about the baffle wall 43 to facilitate the separation of the liquid from the liquid-laden air steam.

Figure 4:
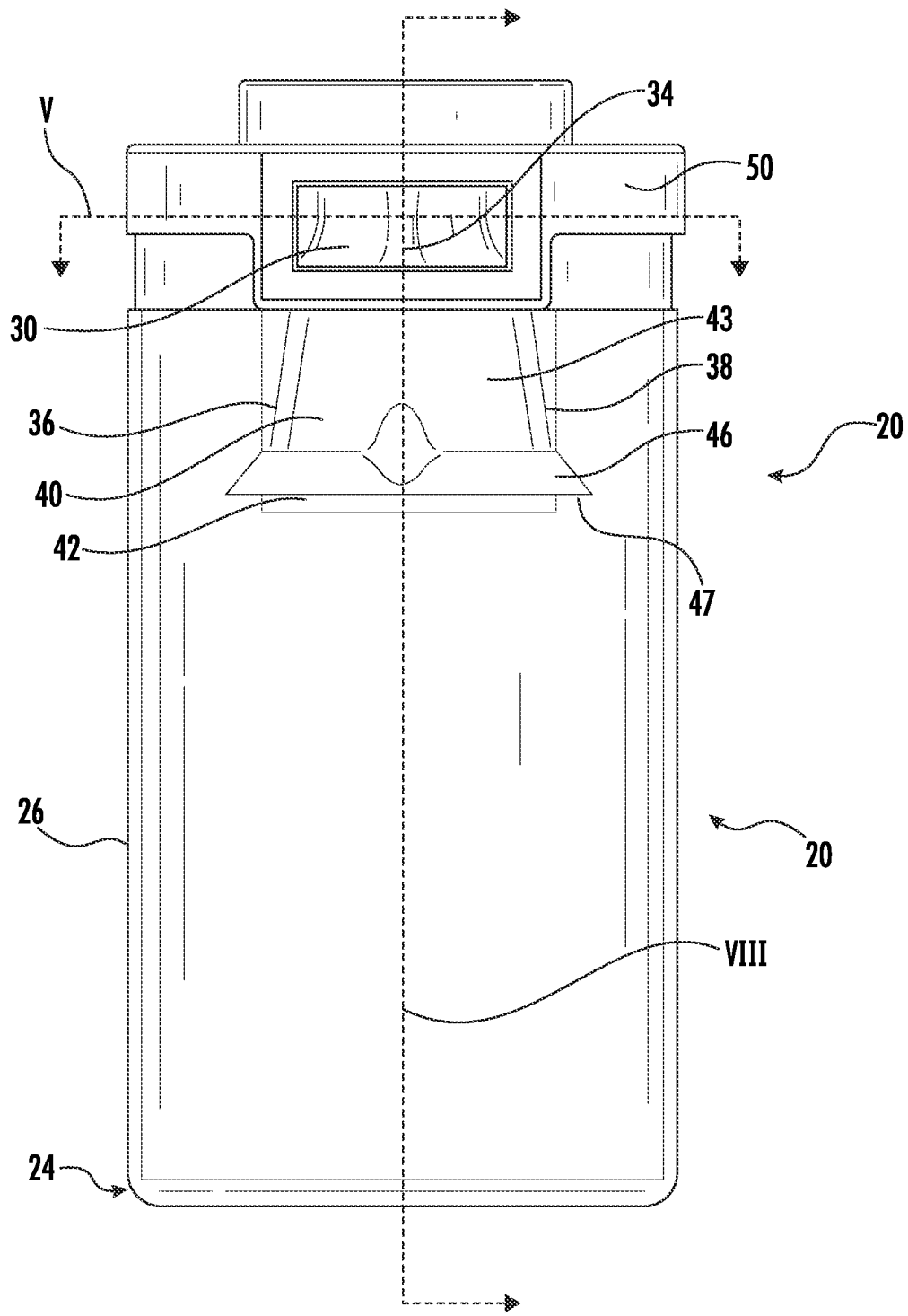
FIG. 4 is a rear view of the recovery tank of FIG. 3.
Figure 5:
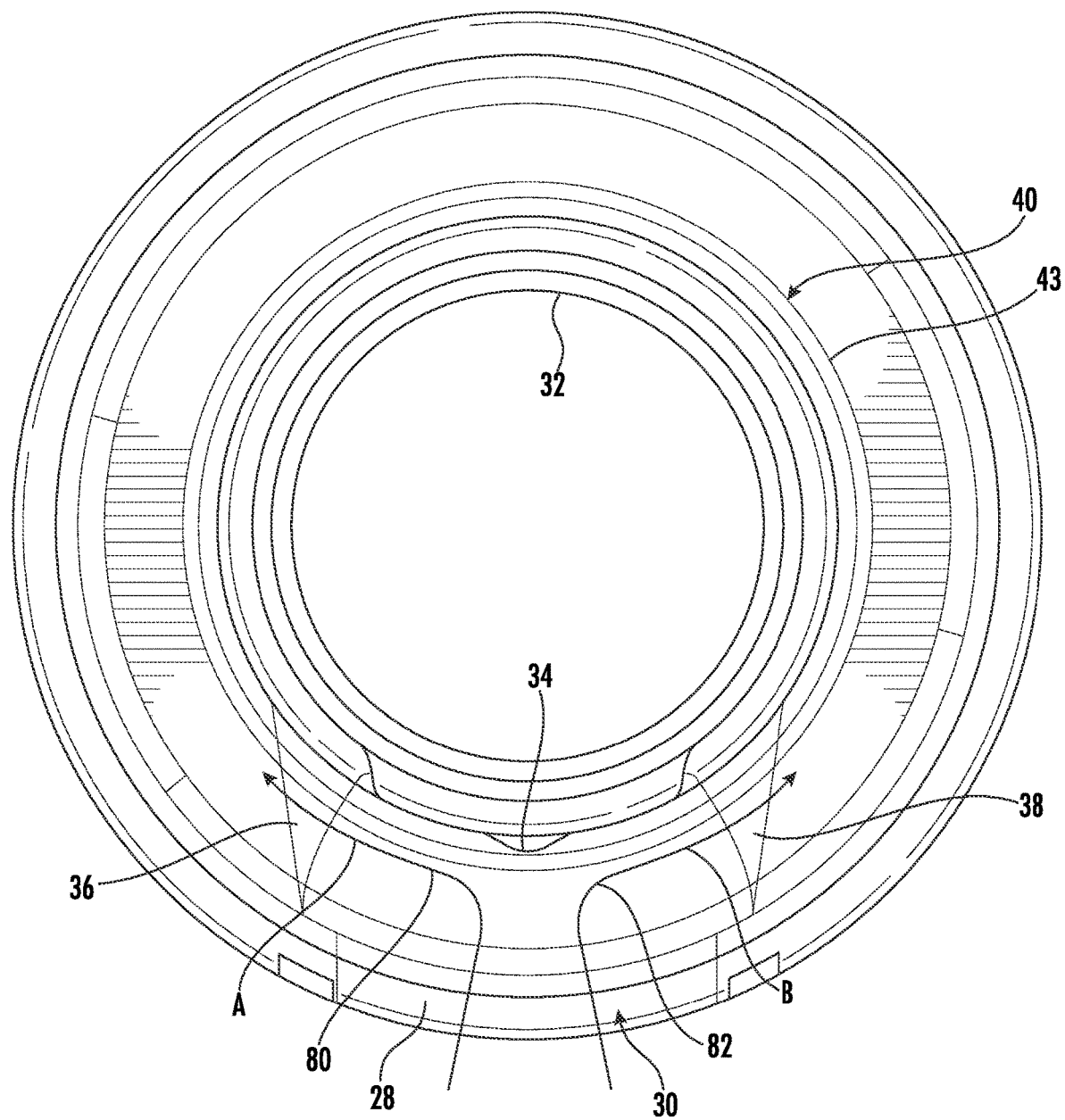
FIG. 5 is a cross-sectional view of the recovery tank of FIG. 4 taken along line V of FIG. 4.

In the embodiment shown in FIG. 4, the recovery tank inlet 28 is positioned aligned with a central portion of the baffle 40. As shown in FIG. 5, the baffle 40 directs a first portion 80 of the air and liquid circumferentially around the baffle 40 in a first direction A, clockwise around the baffle 40. The baffle 40 directs a second portion 82 of the air and liquid in a second direction B, counter clockwise around the baffle 40. The circumferentially directed liquid then moves axially downwardly on the baffle wall 43 and drops off near the lower end 42 toward the bottom portion 24 of the recovery tank 20. Once the liquid is separated from the air flow and deposited in the recovery tank 20, the relatively cleaned air separated from the liquid (shown as C in FIGS. 8 and 8a) exits the recovery tank 20 via an air outlet duct 52 to a recovery tank air outlet 32. The air outlet duct 52 and recovery tank outlet air 32 are in fluid communication with the clean air outlet 14 of the cleaner. The air outlet duct 52 may be along the central axis 200. In one embodiment, the air outlet duct 52 forms at least a portion of the baffle 40. In another embodiment, the baffle 40 is the air outlet duct 52.

Figure 6:
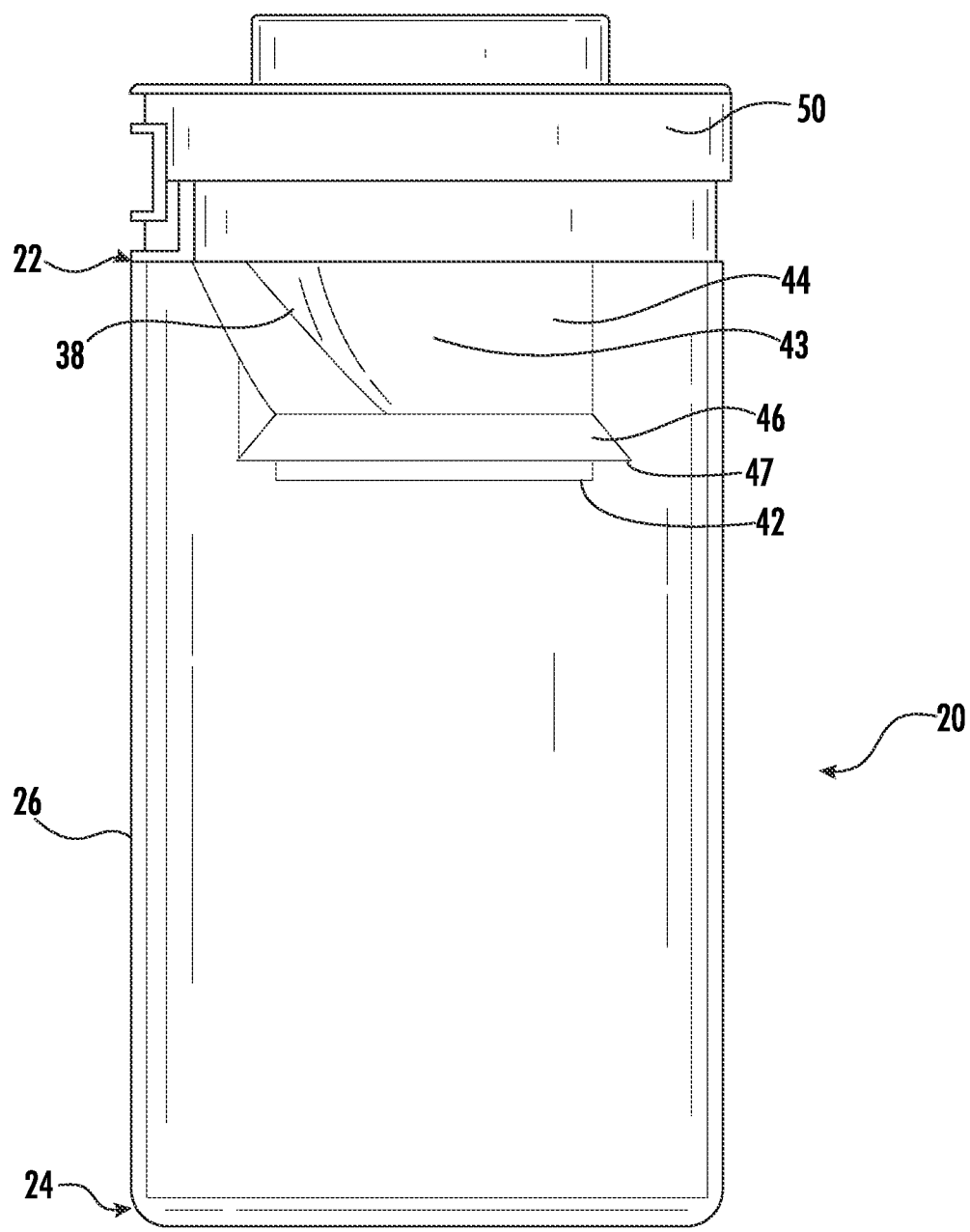
FIG. 6 is a right side view of the recovery tank of FIG. 3.
Figure 6A:
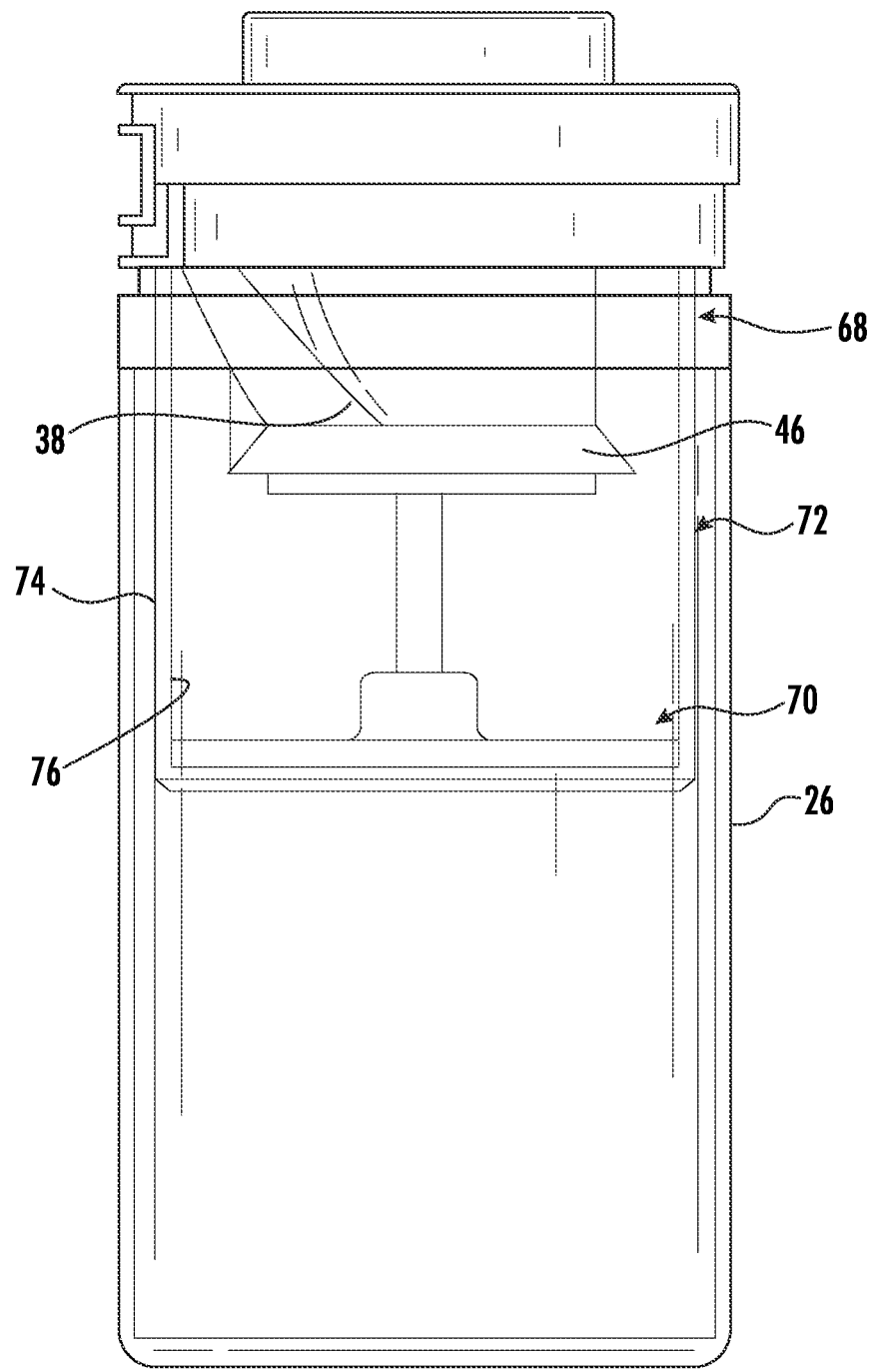
Figure 7:
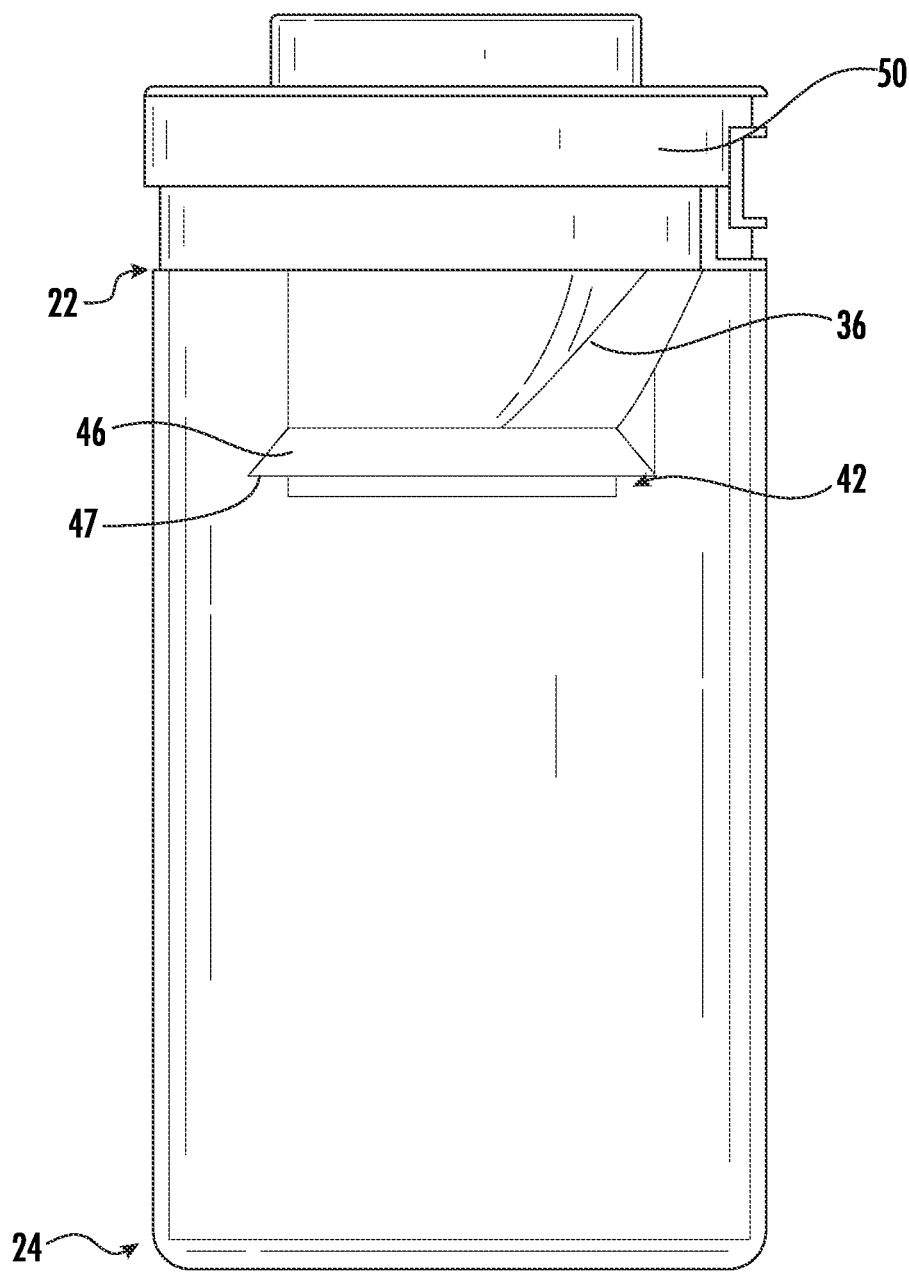
FIG. 7 is a left side view of the recovery tank of FIG. 3.
Figure 7A:
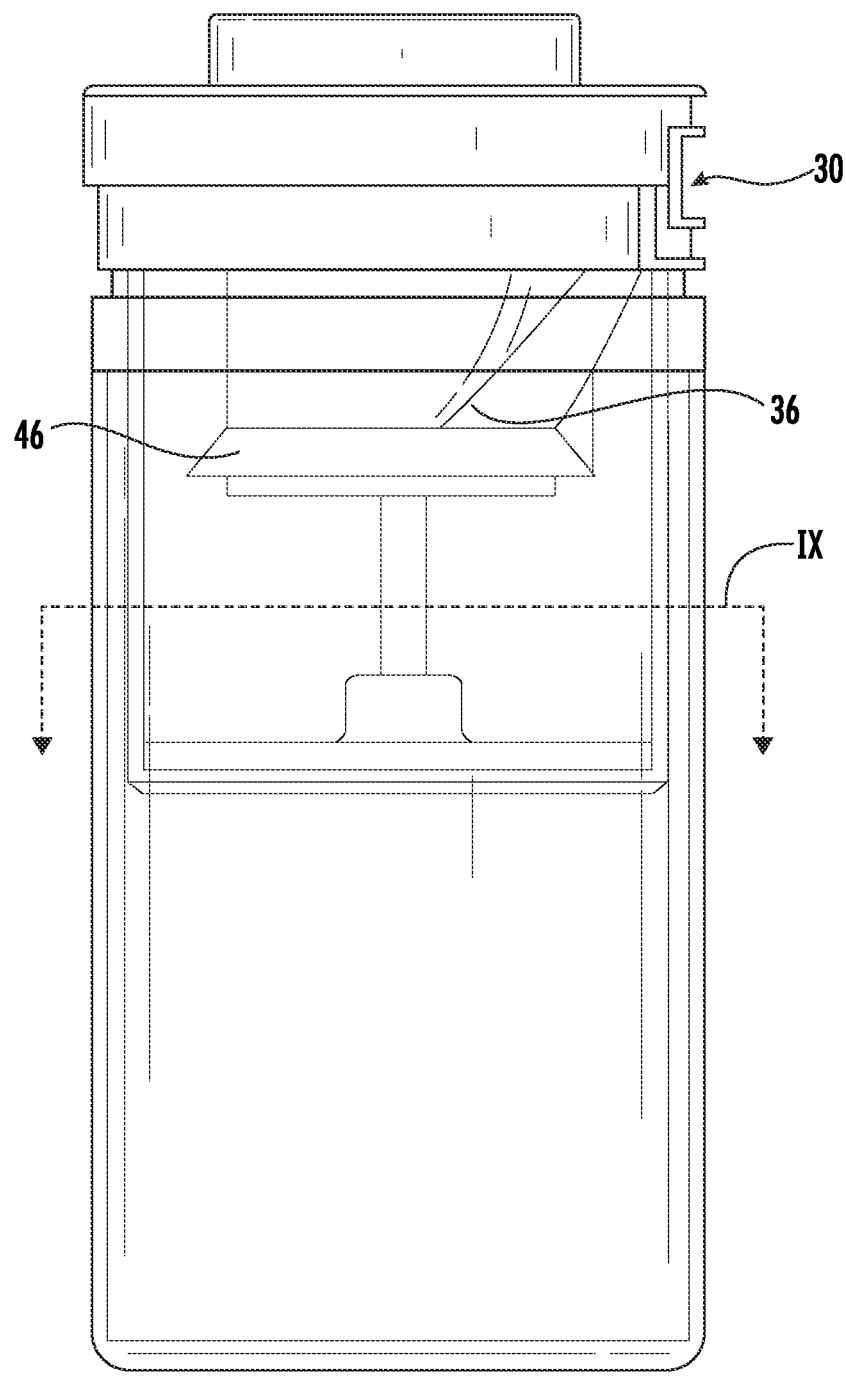

In one embodiment, a diverter 34 is disposed in the inlet passageway 30 adjacent the baffle 40, downstream of the recovery tank inlet 28 (FIG. 5). The diverter 34 is configured to enhance the separation of the stream of liquid and air circumferentially into the first direction A and the second direction B (FIG. 5). In one embodiment, the baffle 40 includes a first surface 36 extending axially downwardly and in the clockwise direction toward the lower end 42 of the baffle 40 (FIG. 7a). The baffle 40 further includes a second surface 38 extending axially downwardly and in the counter clockwise direction toward the lower end 42 of the baffle 40 (FIG. 6a). The first surface 36 and the second surface 38 are configured to direct the first portion 80 and the second portion 82 of the stream of liquid circumferentially and axially downward, toward the lower end 42 of the baffle 40. We found that without the first surface 36 and the second surface 38, a portion of the incoming liquid-laden airflow entering the recovery tank 20 could flow axially downward along the baffle wall 43 with little circumferential component to the flow. When a large portion of the incoming liquid was directed immediately downwardly without circumferential flow, the flow of liquid was more likely to cause excessive detergent foaming, and for liquid to become re-entrained with the air exiting through the air outlet duct 52 causing liquid to enter the recovery tank air outlet 32. However, by including the first surface 36 and the second surface 38, the incoming liquid-laden airflow disperses more evenly about the surface of the baffle wall 43, and the liquid and air are more effectively separated by the baffle 40.

The illustrated baffle 40 further includes a skirt 46. In one embodiment, the skirt 46 is frusto-conical and positioned around the lower end 42 of the baffle 40. In the illustrated embodiment, the first surface 36 and the second surface 38 direct liquid along the baffle wall 43 to the frusto-conical skirt 46. The surface of the skirt 46 slopes laterally away from the baffle 40. The skirt 46 is configured to divert the separated liquid flowing along the baffle wall 43 laterally outwardly and downwardly toward the bottom portion 24 of the recovery tank, such that liquid that drops from the skirt 46 is spaced from the air outlet duct 52 by the dimension of the skirt 46, thereby reducing the amount of separated liquid that is re-entrained into the cleaned air flow entering the air outlet duct 52.

Figure 7B:
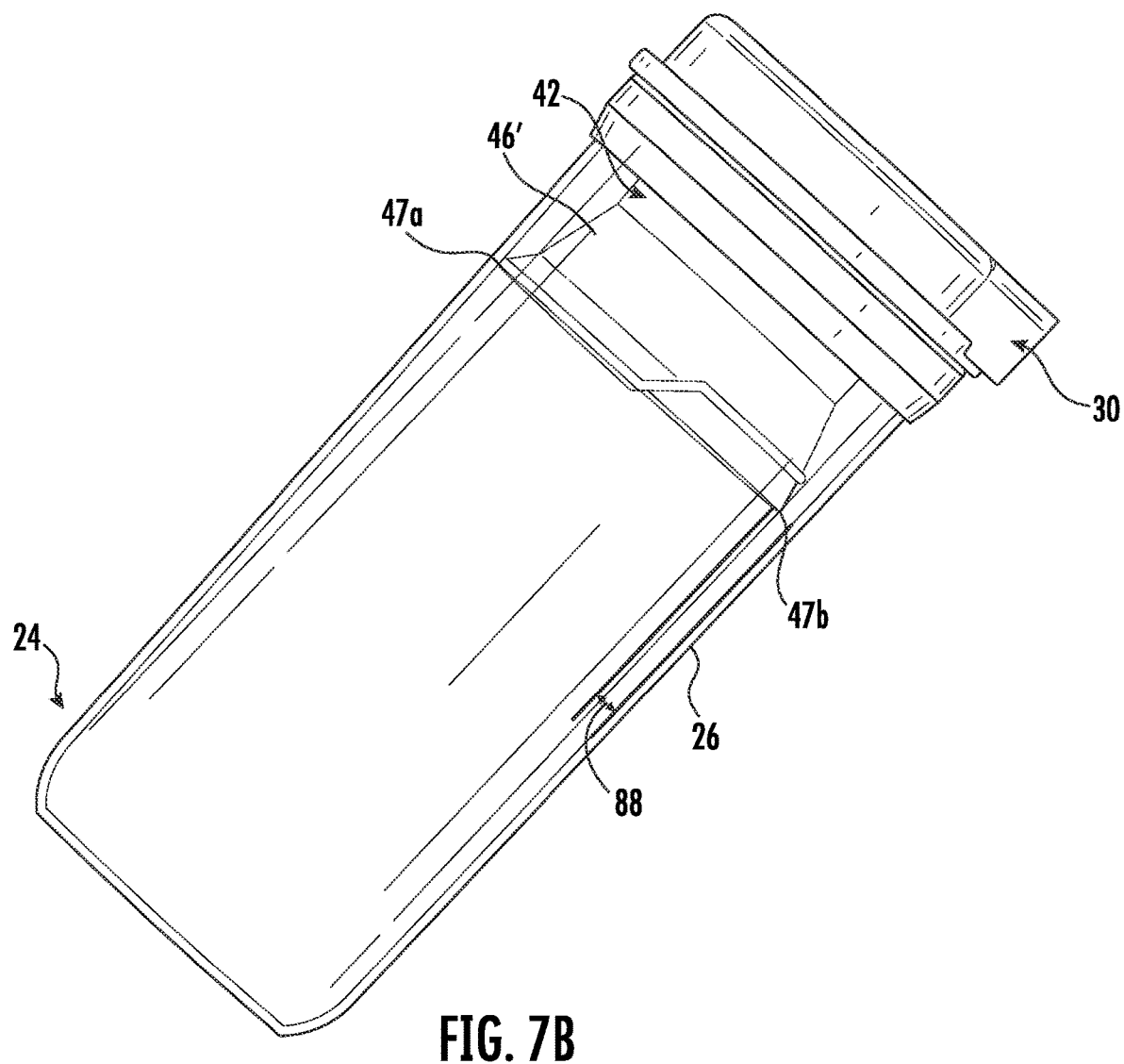

A distal end 47 of the skirt may be spaced axially away from or may be even with the lower end 42 of the baffle. In the embodiment shown in FIGS. 3, 4, and 6, the distal end 47 of the skirt is spaced from the lower end 42 in the direction of a lid assembly 50. In the embodiment shown in FIGS. 4b, 7b, and 8b, the distal end 47 of the skirt is spaced from the lower end 42 in the direction of the bottom portion 24. In this embodiment, the skirt 46' extends axially beyond the lower end 42. In the embodiment illustrated in FIG. 8, a diameter of a distal edge 47 of the skirt $D_1$ is greater than a diameter of the lower end 42 of the baffle $D_2$. In one embodiment, the diameter of the distal edge 47 of the skirt $D_1$ is between 1 and 20 millimeters greater than the diameter of the lower end 42 of the baffle $D_2$. In one embodiment, the diameter of the distal edge 47 of the skirt $D_1$ is between 5 and 15 millimeters greater than the diameter of the lower end 42 of the baffle $D_2$. The separated liquid drops to the bottom portion 24 of the recovery tank by gravitational force, while the air stream exits through the air outlet duct 52 and out the recovery tank outlet 32.

The distance from the distal edge 47 of the skirt 46 to the adjacent sidewall 26 may be a uniform distance or may be a variable distance, as desired based on the geometry of the baffle 40 and the recovery tank 20. In some embodiments the distance between the distal edge 47 and the adjacent sidewall 26 is not critical. In the embodiment illustrated in FIG. 7b the distal edge 47 of the skirt 46' has a variable distance 88 from the recovery tank sidewall 26. The recovery tank 20 and baffle 40 in the illustrated embodiment are configured to be coupled to the upright portion 19 of the floor cleaner, and configured to be inclined with the upright portion 19 when the floor cleaner is in the inclined use position. Illustrated in the use position in FIGS. 7b and 8b, the skirt 46' includes an inclined distal edge 47a on a forward portion of the skirt 46' and a reclined distal edge 47b on a rearward portion of the skirt 46'. The inclined distal edge 47a is positioned adjacent to the recovery tank sidewall 26. In one embodiment, the inclined distal edge 47a is spaced between 0 mm and 30 mm from the sidewall 26. In one embodiment, the inclined distal edge 47a is spaced between 0 and 10 mm from the sidewall 26, and may be spaced between 0 and 3 mm from the sidewall 26. When the inclined distal edge 47a is 0 mm from the sidewall 26, the inclined distal edge may include a resilient material to contact the sidewall 26, such as a wiper. In embodiment illustrated in FIG. 7b, the distance 88 between the reclined distal edge 47b and the sidewall 26 is greater than the distance between the inclined distal edge 47a and the sidewall 26. In one embodiment, the reclined distal edge 47b is spaced between 3 mm and 60 mm from the sidewall 26. In one embodiment, the reclined distal edge 47b is spaced between 5 mm and 25 mm from the sidewall 26, and may be spaced between 5 and 15 mm from the sidewall 26. The inclined distal edge 47a is configured to divert separated liquid away from the forward portion of the baffle 40 in the inclined use position, so as to inhibit liquid re-entrainment. Separated liquid that reaches the inclined distal edge 47a is directed circumferentially toward the reclined distal edge 47b and downwardly through the gap between the reclined distal edge 47b and the sidewall 26 into the recovery tank 20. The frusto-conical shape of the baffle wall 43 and configuration of the distal end 47 of the skirt 46' inhibit excessive foaming and liquid re-entrainment.

In one embodiment, the baffle 40 is coupled to the lid assembly 50. The baffle 40 may be integrally molded to the lid assembly 50, or may be removably coupled such as by a quarter-turn lock, snap-fit, friction fit, fasteners, or the like. The baffle 40 may be removable from the recovery tank 20 with the lid assembly 50 such that the liquid may be removed from the tank body 20.

In one embodiment, the recovery tank 20 includes a strainer 60 configured to strain debris from the liquid stream entering the recovery tank 20 during operation of the floor cleaner 10. The strainer 60 is disposed beneath the baffle 40 positioned to receive liquid dropping from the baffle wall 43. The strainer 60 is positioned to receive liquid dropping from the baffle wall 43 to strain debris from the separated liquid stream prior to the liquid being deposited in the bottom portion 24 of the recovery tank. In one embodiment, the strainer 60 is removably coupled to the top portion 22 of the recovery tank. In one embodiment, the strainer 60 is supported by the recovery tank sidewall 26 such as by supporting ribs, or a ledge or protrusion formed in the sidewall.

Figure 4A:
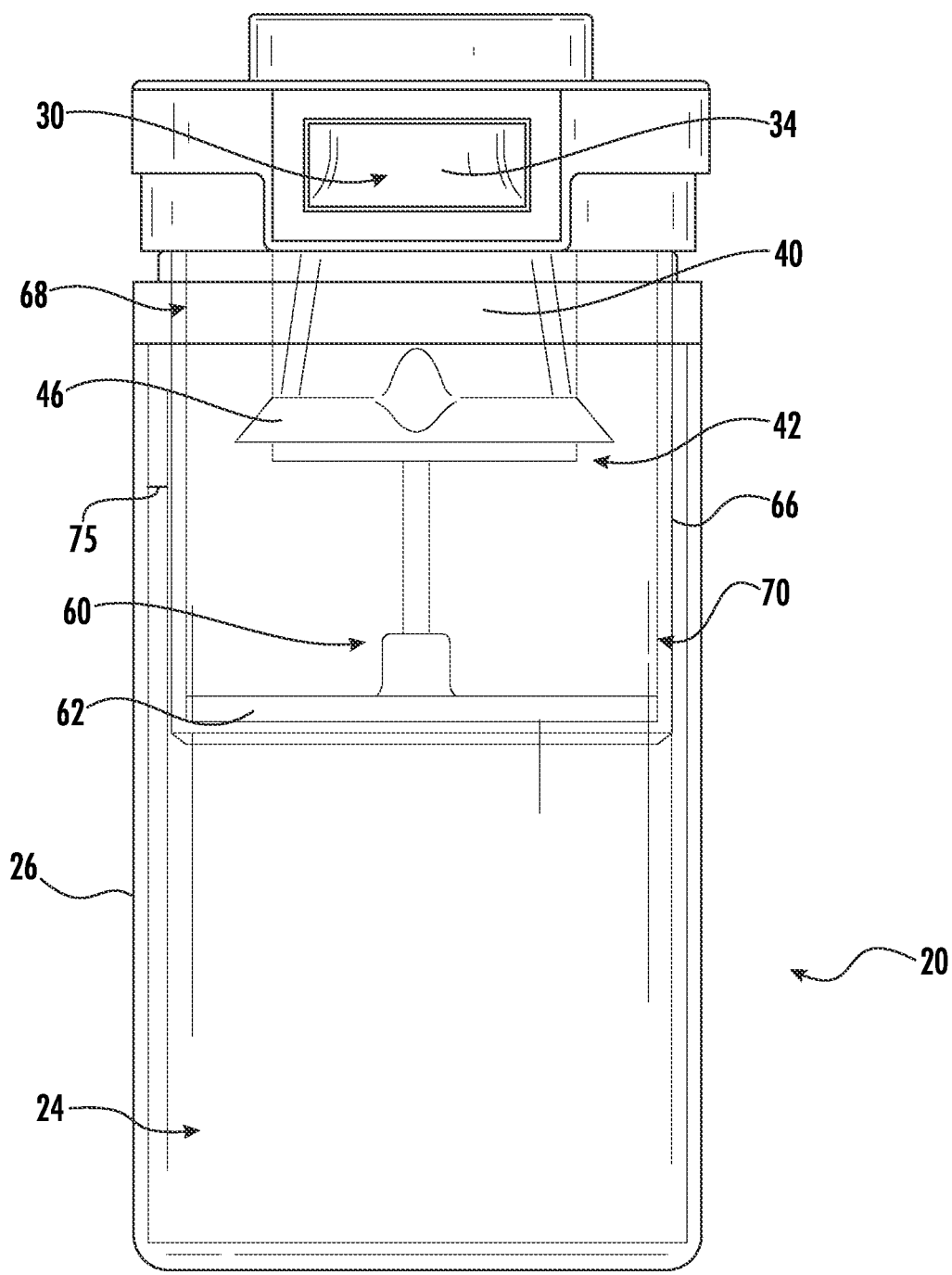
FIG. 4a is a rear view of an alternative recovery tank embodiment shown having a transparent recovery tank sidewall and transparent strainer housing.
Figure 4B:
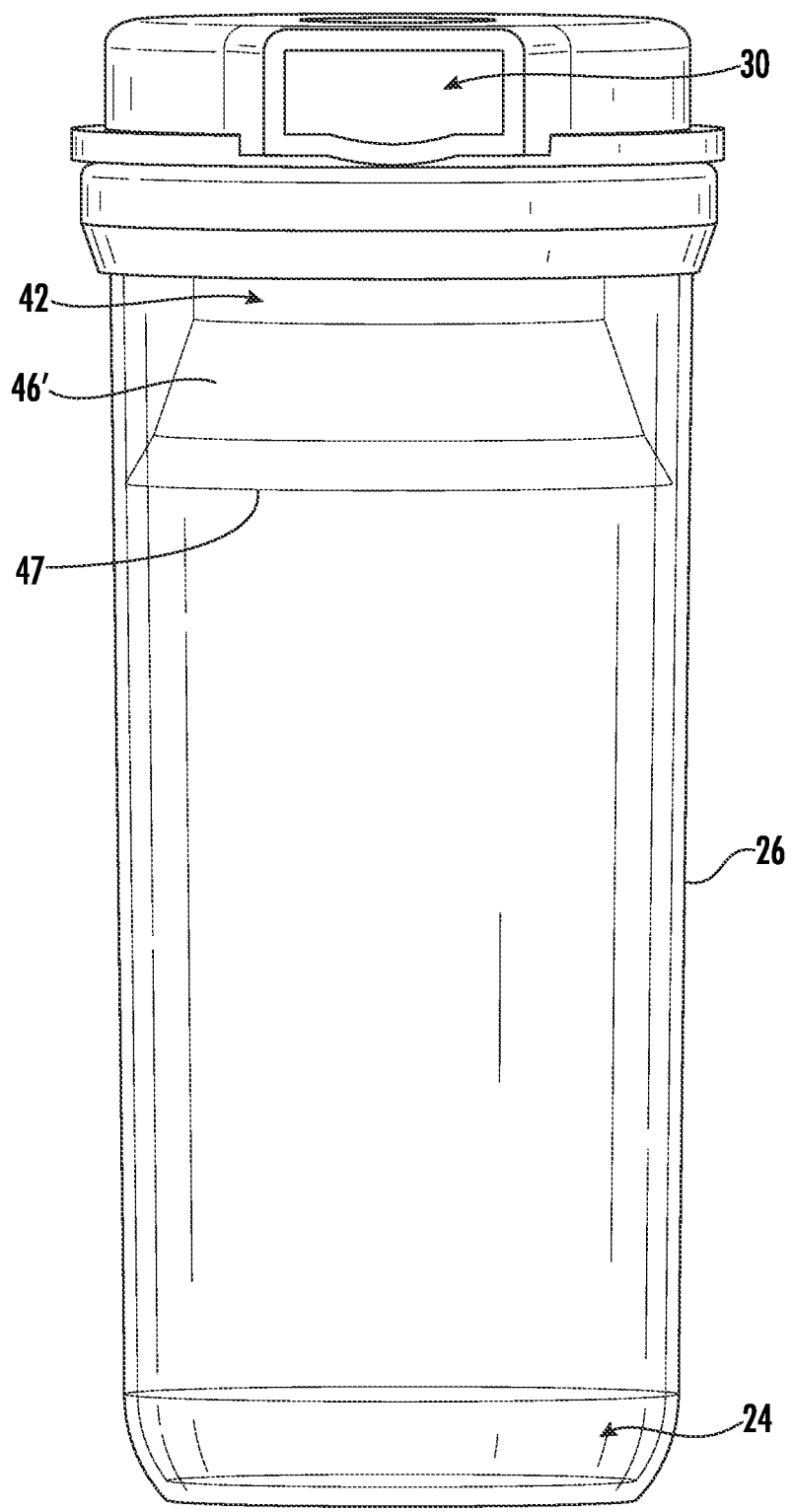
FIG. 4b is a rear view of an alternative recovery tank embodiment shown having a transparent recovery tank sidewall.
Figure 8A:
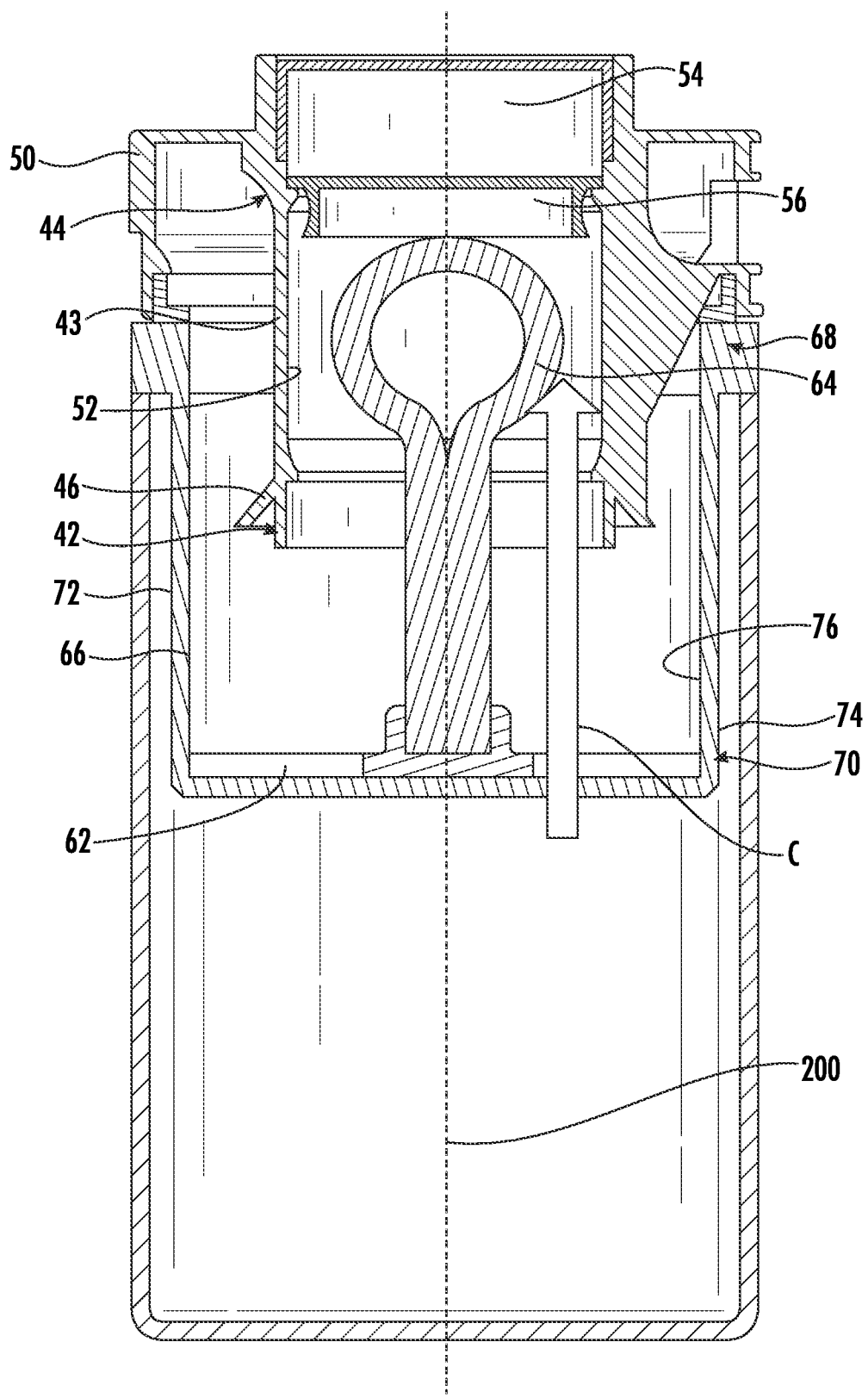
Figure 8B:
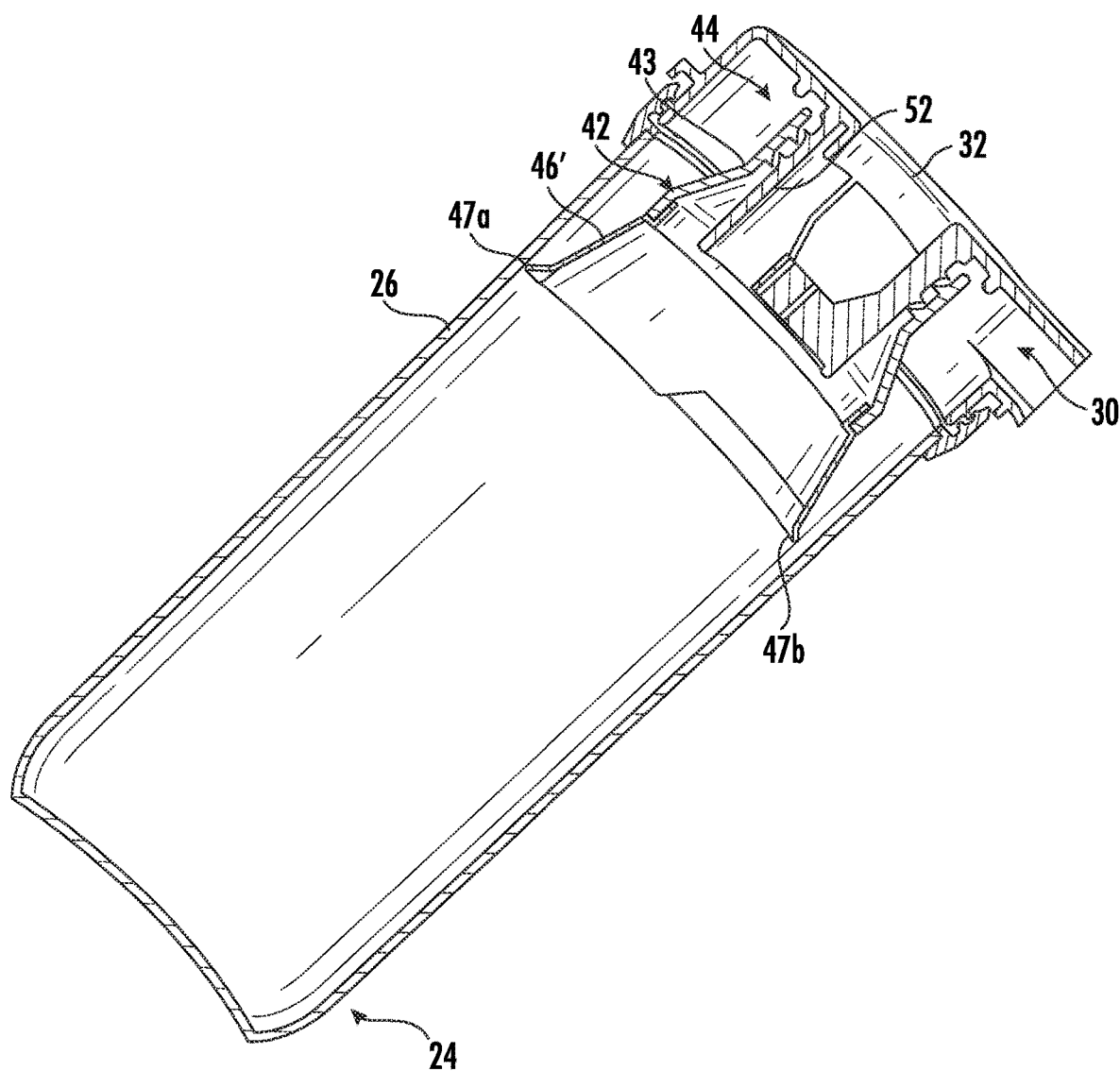
FIG. 8b is a cross-sectional view of the recovery tank of FIG. 4b.
Figure 9:
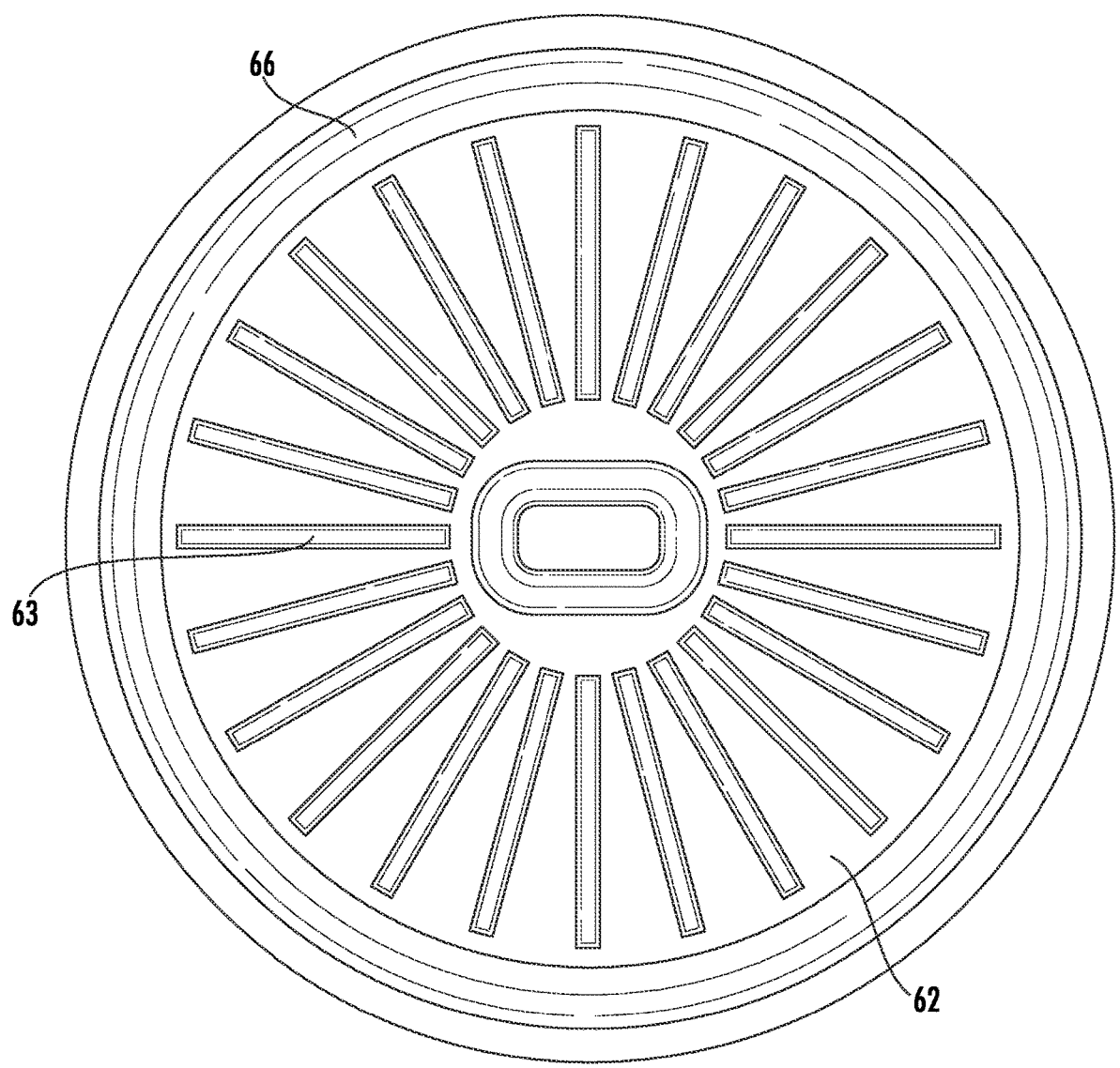
FIG. 9 is a cross-sectional view of the recovery tank of FIG. 7a showing a strainer.
Figure 10:
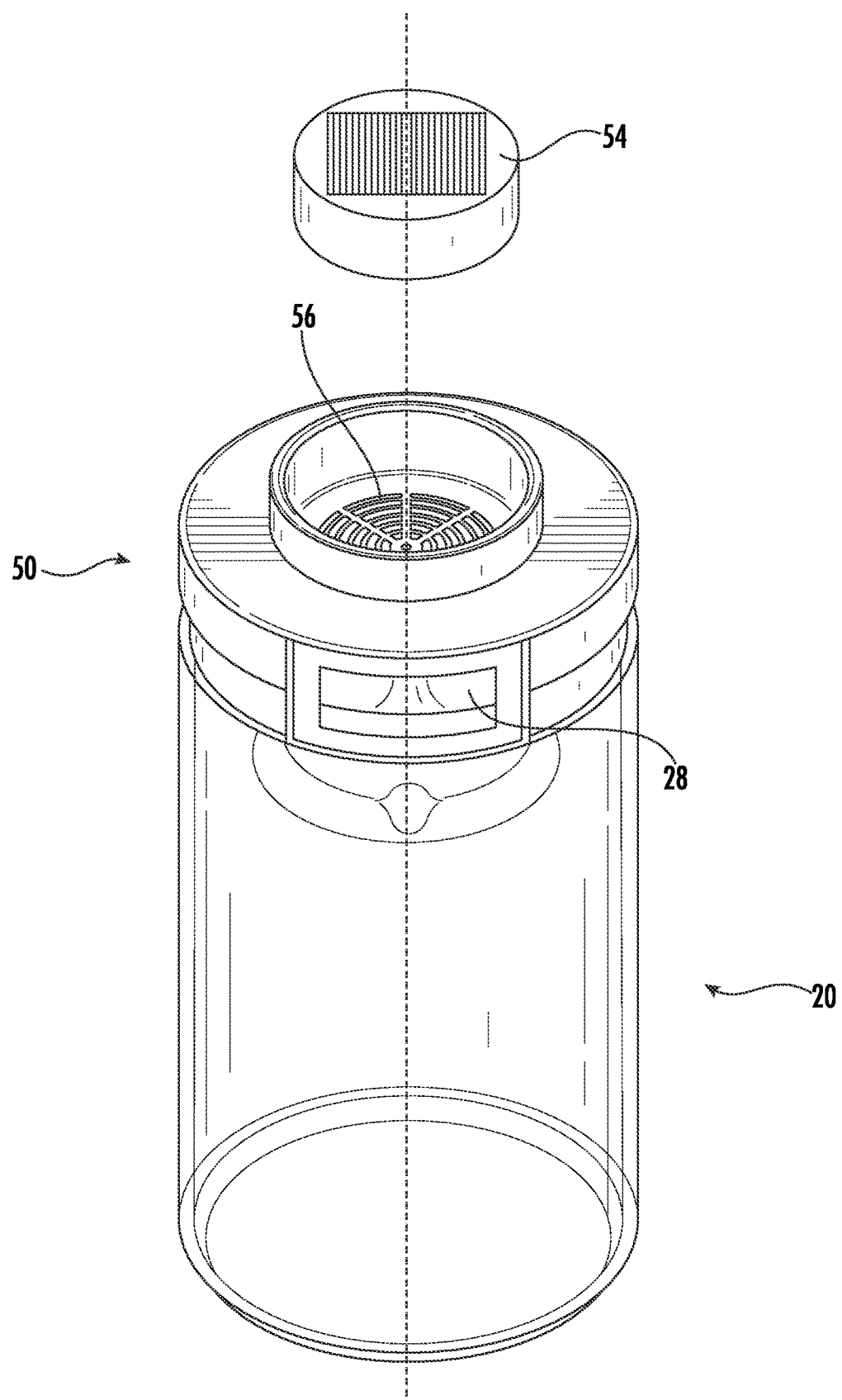
FIG. 10 is a partially exploded perspective view of the recovery tank of FIG. 4 with a filter assembly removed.

In the embodiment illustrated in FIGS. 4a, 6a, and 8a, the recovery tank 20 includes the strainer 60 including a strainer housing 66 surrounding the baffle 40 such that the flow from the recovery tank inlet 28 enters the strainer housing 66 to impinge against the baffle 40. The strainer housing 66 includes a top end 68, a bottom end 70, and a sidewall 72 extending between the top end 68 and the bottom end 70, the strainer housing including a plurality of drain holes 63. The sidewall 72 of the strainer housing includes an exterior surface 74 and an interior surface 76. In one embodiment, the strainer 60 includes a removable strainer body portion 62. In the illustrated embodiment, the bottom end 70 of the strainer housing 66 includes the strainer body 62 separable from the strainer housing 66, which may be adjacent to and abutting the interior surface 76. The strainer body 62 may form the bottom end 70 of the strainer housing 66. The strainer body 62 includes at least a portion of the plurality of drain holes 63 to allow liquid and air to drain through the holes 63, while capturing debris. In other embodiments, the strainer 60 includes a grid or mesh body portion defining the drain holes 63. The drain holes 63 are disposed below the lower end 42 of the baffle, and are configured to filter debris from the separated liquid as the liquid is directed downwardly.

The strainer 60 may be provided with a handle portion 64. In one embodiment, the handle portion 64 is connected to the strainer housing 66 extending upwardly toward the top end 68 of the strainer housing. In one embodiment, the handle portion 64 is connected to the strainer body 62 extending upwardly toward the top end 68 of the strainer housing. In the embodiment illustrated in FIG. 8a, the strainer housing 66 surrounds at least a portion of the air outlet duct 52 and the handle portion 64 extends into the air outlet duct 52. This is advantageous because the air outlet duct 52 shields the handle portion 64, which will stay relatively clean during operation of the floor cleaner 10. The user removes the strainer housing 66 or strainer body 62 by grasping the relatively clean handle portion 64, thereby creating a more pleasant user interaction upon removal of the strainer 60 after use.

In one embodiment, the strainer 60 is removable from the recovery tank 20 with the lid assembly 50 to facilitate removing the filtered debris from the strainer body 62 and/or strainer housing 66. In this embodiment, the user separates the strainer housing 66 from the lid assembly to empty the strainer housing 66. In one embodiment, the user may pull the handle portion 64 of the strainer to release the strainer body 62 from the strainer housing 66. In one embodiment, the strainer housing 66 is coupled to the recovery tank 20, and is covered by the lid assembly 50. In this embodiment, when the lid assembly 50 is removed, the upwardly extending handle portion 64 of the strainer is exposed. The user can then pull upwardly on the handle portion 64 to remove the strainer body 62 or the strainer housing 66 through the open top portion 22 of the recovery tank, and empty the collected debris from the strainer.

In the embodiment illustrated in FIG. 4a, the exterior surface 74 of the strainer housing includes a seal 75 configured to engage the sidewall 26 of the recovery tank. The seal 75 inhibits separated liquid from splashing into the gap between the sidewall 26 and the exterior surface 74 of the strainer housing 66, thereby keeping a portion of the exterior surface 74 above the seal 75 relatively clean. In this embodiment, when the strainer housing 66 is removed from the recovery tank 20, the portion of the exterior surface 74 above the seal 75 will be relatively clean for the user to grasp, thereby creating a more pleasant user interaction upon removal.

Figure 11:
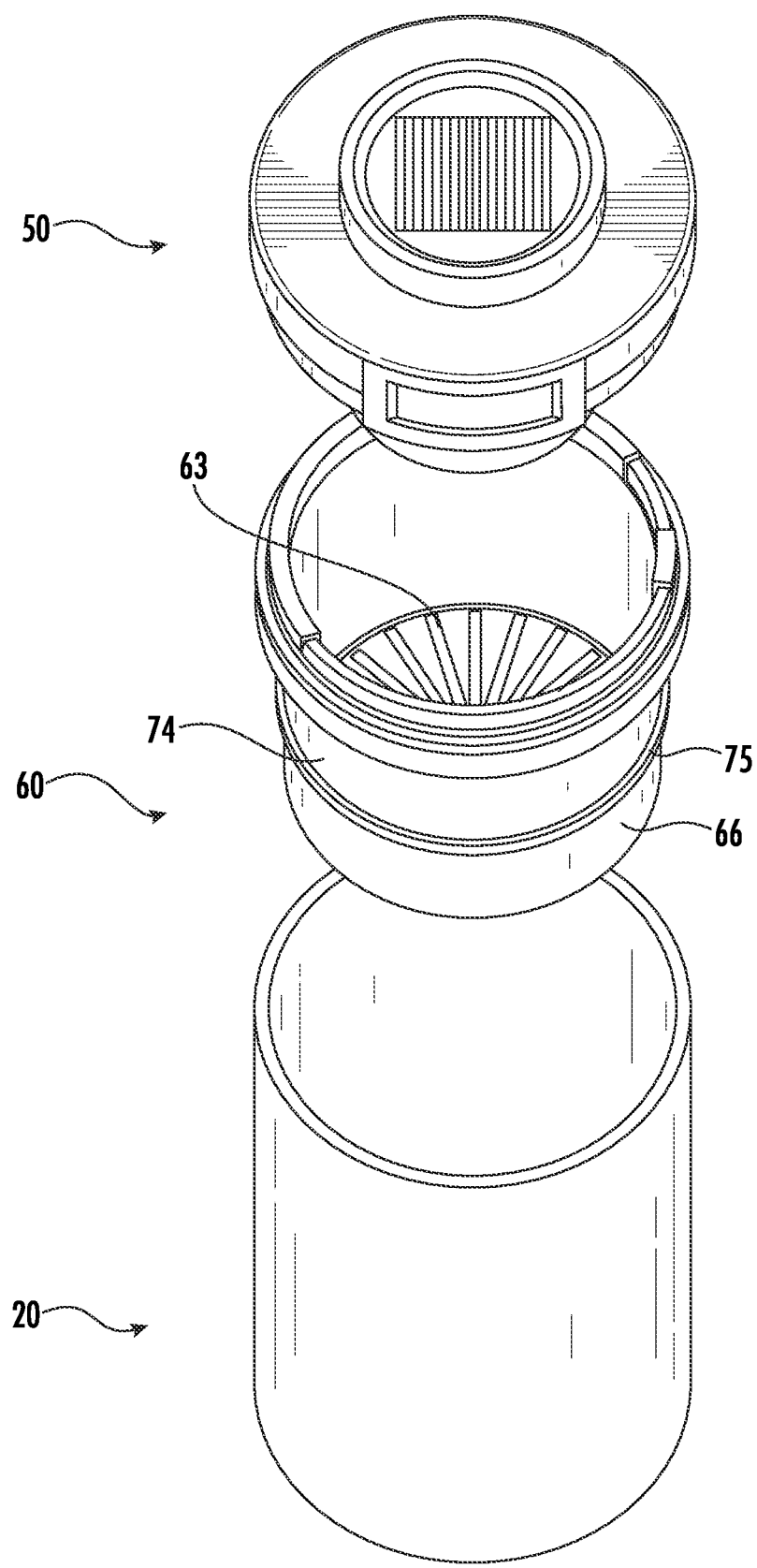
FIG. 11 is a partially exploded perspective view of an alternative embodiment of a recovery tank with a lid assembly and a strainer housing removed.

In one embodiment, such as shown in FIG. 11, the strainer 60 does not include a handle portion. The illustrated strainer housing 66 includes drain holes 63 provided in the bottom of the housing, and the strainer housing 66 is removable for emptying. As illustrated in FIG. 11, the lid assembly 50 and the strainer 60 are separately removable from the recovery tank 20, or the strainer 60 is attached to and removable from the recovery tank 20 with the lid assembly 50. The user can manipulate the strainer 60 by grasping the exterior surface 74 of the strainer housing. Specifically, the user can grasp the exterior surface 74 above the seal 75. As discussed above, the seal 75 provides a clean portion of the exterior surface 74 for the user to interact with. The user can then invert the strainer 60 to remove the debris.

The recovery tank 20 can further include a filter assembly 54 positioned along the air outlet duct 52 or the recovery tank outlet air 32, upstream of the clean air outlet 14. In one embodiment, the filter assembly 54 is located in the lid assembly 50. The filter assembly 54 may be supported by a grid or mesh portion 56 (FIG. 11). The grid portion 56 and filter assembly 54 are configured to further filter the air flow before the air flow exits the clean air outlet 14.

The recovery tank 20 is removably coupled to the floor cleaner 10 to allow a user to remove the recovery tank and empty the liquid contents. In the embodiment illustrated in FIG. 1, the recovery tank 20 is coupled to the upright portion 19 of the floor cleaner. The baffle 40 is arranged to be tilted with the upright portion 19 in operation. In the tilted use position, the recovery tank inlet 28 is positioned on a back side of the recovery tank and directed towards a front side of the recovery tank 20. The recovery tank inlet 28 is directed upwardly toward the tilted baffle wall 43. In the embodiment illustrated in FIG. 2, the recovery tank may be operatively coupled to one or more other portions of the floor cleaner, such as the base 18. In the use position illustrated in FIG. 2, the baffle 40 is arranged vertically.

In operation, when the user is ready to empty the recovery tank 20, the user removes the lid assembly 50. The lid assembly 50 and strainer housing 66, if present, may be removed from the recovery tank 20. The user then may empty the strained dirty fluid from the recovery tank 20. The user then releases the strainer housing 66 from the lid assembly 50, if connected, and empties the filter debris from the strainer 60.

Other floor cleaners within the scope of this disclosure may include a different type of base, such as including the recovery tank and a supply tank coupled to the base. In addition, other extractors may be different that the illustrated upright configuration. For example, other embodiments of the extractor may include canister extractors or portable extractors also known as spot cleaners.

Various features and advantages of the invention are set forth in the following claims.

What is claimed is:

1. A floor cleaner comprising:
a fluid flow path extending from a dirty air inlet to a clean air outlet;
a fluid flow motor positioned in the fluid flow path;
a recovery tank positioned in the fluid flow path having a top portion, a bottom portion, and a sidewall extending between the top portion and the bottom portion,
the recovery tank configured to receive liquid-laden air from the dirty air inlet, the recovery tank having a recovery tank inlet forming an inlet passageway in fluid communication with the dirty air inlet and a recovery tank outlet in fluid communication with the clean air outlet;
a baffle with a baffle wall surrounding a baffle axis, the baffle wall having an upper end and a lower end opposite the upper end, wherein the baffle axis extends in a direction from the bottom portion of the recovery tank to the top portion of the recovery tank,
the baffle aligned with the inlet passageway, the inlet passageway configured to direct a stream of liquid-laden air against the baffle wall directing a first portion of the liquid circumferentially around the baffle in a clockwise direction and a second portion in a counter clockwise direction to separate the liquid from the air;
wherein the inlet passageway includes a diverter configured to divide the stream into the first portion and the second portion.

2. The floor cleaner of claim 1, wherein the baffle includes a first surface toward the clockwise direction that extends downwardly toward the lower end of the baffle wall, and a second surface toward the counter clockwise direction that extends downwardly toward the lower end of the baffle wall, wherein the diverter and the baffle direct the first portion and the second portion of the stream of liquid in the respective circumferential direction and an axial direction.

3. A floor cleaner comprising:
a fluid flow path extending from a dirty air inlet to a clean air outlet;
a fluid flow motor positioned in the fluid flow path;
a recovery tank positioned in the fluid flow path having a top portion, a bottom portion, and a sidewall extending between the top portion and the bottom portion,
the recovery tank configured to receive liquid-laden air from the dirty air inlet, the recovery tank having a recovery tank inlet forming an inlet passageway in fluid communication with the dirty air inlet and a recovery tank outlet in fluid communication with the clean air outlet;
a baffle with a baffle wall surrounding a baffle axis, the baffle wall having an upper end and a lower end opposite the upper end, wherein the baffle axis extends in a direction from the bottom portion of the recovery tank to the top portion of the recovery tank,
the baffle aligned with the inlet passageway, the inlet passageway configured to direct a stream of liquid-laden air against the baffle wall directing a first portion of the liquid circumferentially around the baffle in a clockwise direction and a second portion in a counter clockwise direction to separate the liquid from the air;
wherein the baffle wall includes a skirt around the lower end of the baffle wall.

4. The floor cleaner of claim 3, wherein the skirt is frusto-conical.

5. The floor cleaner of claim 3, wherein a diameter of a distal edge of the skirt is between 1 and 10 millimeters greater than a diameter of the lower end of the baffle wall.

6. The floor cleaner of claim 3, wherein at least a portion of a distal edge of the skirt is adjacent the sidewall of the recovery tank.

7. The floor cleaner of claim 6, wherein the skirt includes an inclined distal edge on a forward portion of the skirt and a reclined distal edge on a rearward portion of the skirt, wherein a distance between the inclined distal edge and the sidewall is between 0 and 10 mm, and wherein a distance between the reclined distal edge and the sidewall is greater than the distance between the inclined distal edge and the sidewall.

8. The floor cleaner of claim 7, wherein the distance between the inclined distal edge and the sidewall is between 0 and 5 mm, and wherein the distance between the reclined distal edge and the sidewall is greater than the distance between the inclined distal edge and the sidewall.

9. The floor cleaner of claim 1, wherein the recovery tank sidewall forms a central axis extending between the bottom portion and the top portion, wherein the baffle axis is disposed along the central axis.

10. The floor cleaner of claim 9, wherein the central axis and the baffle axis are coaxial.

11. A floor cleaner comprising:
a fluid flow path extending from a dirty air inlet to a clean air outlet;
a fluid flow motor positioned in the fluid flow path;
a recovery tank positioned in the fluid flow path having a top portion, a bottom portion, and a sidewall extending between the top portion and the bottom portion,
the recovery tank configured to receive liquid-laden air from the dirty air inlet, the recovery tank having a recovery tank inlet forming an inlet passageway in fluid communication with the dirty air inlet and a recovery tank outlet in fluid communication with the clean air outlet;

a baffle with a baffle wall surrounding a baffle axis, the baffle wall having an upper end and a lower end opposite the upper end, the baffle aligned with the inlet passageway, the inlet passageway configured to direct a stream of liquid-laden air against the baffle wall directing a first portion of the liquid circumferentially around the baffle in a clockwise direction and a second portion in a counter clockwise direction to separate the liquid from the air;

wherein the recovery tank includes a lid assembly removably coupled to the top portion covering an opening in the recovery tank, wherein the baffle is connected to the lid assembly.

12. The floor cleaner of claim 11, wherein the baffle is removable from the recovery tank with the lid assembly.

13. The floor cleaner of claim 1, wherein the recovery tank includes an air outlet duct in communication with the recovery tank outlet.

14. The floor cleaner of claim 13, wherein the air outlet duct forms at least a portion of the baffle.

15. The floor cleaner of claim 1, wherein the lower end of the baffle wall is spaced a predetermined distance above the bottom portion of the recovery tank.

16. The floor cleaner of claim 1, further comprising a base movable along a surface to be cleaned and an upright portion coupled to the base, the upright portion movable between an inclined use position and an upright storage position.

17. The floor cleaner of claim 16, wherein the recovery tank is disposed on the base.

18. The floor cleaner of claim 16, wherein the recovery tank is disposed on the upright portion.

19. The floor cleaner of claim 18, wherein the recovery tank inlet is on a back side of the recovery tank and the inlet passageway is directed toward a forward side of the recovery tank.

20. A floor cleaner comprising:
a base movable along a surface to be cleaned;
an upright portion coupled to the base, the upright portion movable between an inclined use position and an upright storage position;
a fluid flow path extending from a dirty air inlet to a clean air outlet;
a fluid flow motor positioned in the fluid flow path;
a recovery tank positioned in the fluid flow path having a top portion, a bottom portion, and a sidewall extending between the top portion and the bottom portion, wherein the recovery tank is disposed on the upright portion,
the recovery tank configured to receive liquid-laden air from the dirty air inlet, the recovery tank having a recovery tank inlet forming an inlet passageway in fluid communication with the dirty air inlet and a recovery tank outlet in fluid communication with the clean air outlet;
a baffle with a baffle wall surrounding a baffle axis, the baffle wall having an upper end and a lower end opposite the upper end,
the baffle aligned with the inlet passageway, the inlet passageway configured to direct a stream of liquid-laden air against the baffle wall directing a first portion of the liquid circumferentially around the baffle in a clockwise direction and a second portion in a counter clockwise direction to separate the liquid from the air;
wherein the inlet passageway is directed upwardly and toward the forward side of the recovery tank in operation.

21. A floor cleaner comprising:
a fluid flow path extending from a dirty air inlet to a clean air outlet;
a fluid flow motor positioned in the fluid flow path;
a recovery tank positioned in the fluid flow path having a top portion, a bottom portion, and a sidewall extending between the top portion and the bottom portion,
the recovery tank configured to receive liquid-laden air from the dirty air inlet, the recovery tank having a recovery tank inlet forming an inlet passageway in fluid communication with the dirty air inlet and a recovery tank outlet in fluid communication with the clean air outlet;
a baffle with a baffle wall surrounding a baffle axis, the baffle wall having an upper end and a lower end opposite the upper end, wherein the baffle axis extends in a direction from the bottom portion of the recovery tank to the top portion of the recovery tank,
the baffle aligned with the inlet passageway, the inlet passageway configured to direct a stream of liquid-laden air against the baffle wall directing a first portion of the liquid circumferentially around the baffle in a clockwise direction and a second portion in a counter clockwise direction to separate the liquid from the air;
wherein the recovery tank includes a strainer housing around the baffle wall, the strainer housing having a top end, a bottom end opposite the top end, and a sidewall extending between the top end and the bottom end, the strainer housing including a plurality of drain holes.

22. The floor cleaner of claim 21, wherein the strainer housing is separable from the baffle wall.

23. The floor cleaner of claim 21, wherein the bottom end of the strainer housing includes a strainer body separable from the strainer housing.

24. The floor cleaner of claim 23, wherein the strainer body includes the plurality of drain holes.

25. The floor cleaner of claim 23, wherein the strainer body includes an upwardly extending handle.

26. The floor cleaner of claim 25, wherein upward movement of the upwardly extending handle removes the strainer body from the strainer housing.

27. The floor cleaner of claim 25, wherein the upwardly extending handle is positioned in an air outlet duct.

28. The floor cleaner of claim 25, wherein the upwardly extending handle extends along the baffle axis.

29. The floor cleaner of claim 21, wherein the strainer housing is removably coupled to the top portion of the recovery tank.

30. The floor cleaner of claim 21, wherein the recovery tank includes a lid assembly removably coupled to the recovery tank covering an opening in the recovery tank, wherein the strainer housing is removably coupled to the lid assembly.

31. The floor cleaner of claim 21, wherein there is a gap between an exterior surface of the strainer housing and an inner portion of the sidewall of the recovery tank, wherein a seal extends from the exterior surface to the inner portion of the sidewall.

32. A floor cleaner comprising:
a fluid flow path extending from a dirty air inlet to a clean air outlet;
a fluid flow motor positioned in the fluid flow path;
a recovery tank positioned in the fluid flow path having a top portion, a bottom portion, and a sidewall extending between the top portion and the bottom portion,
the recovery tank configured to receive liquid-laden air from the dirty air inlet, the recovery tank having a recovery tank inlet forming an inlet passageway in fluid communication with the dirty air inlet and a recovery tank outlet in fluid communication with the clean air outlet;

a baffle with a baffle wall surrounding a baffle axis, the baffle wall having an upper end and a lower end opposite the upper end, wherein the baffle axis extends in a direction from the bottom portion of the recovery tank to the top portion of the recovery tank, the baffle aligned with the inlet passageway, the inlet passageway configured to direct a stream of liquid-laden air against the baffle wall directing a first portion of the liquid circumferentially around the baffle in a clockwise direction and a second portion in a counter clockwise direction to separate the liquid from the air wherein the recovery tank includes a strainer disposed beneath the baffle positioned to receive liquid dropping from the baffle wall.

33. The floor cleaner of claim 32, wherein the strainer is removably coupled to the recovery tank.

34. The floor cleaner of claim 33, wherein the strainer is provided within a strainer housing.

35. The floor cleaner of claim 1, wherein the baffle wall includes a cylindrical portion.

36. The floor cleaner of claim 1, wherein the baffle wall includes a frusto-conical portion.

37. The floor cleaner of claim 11, wherein the inlet passageway includes a diverter configured to divide the stream into the first portion and the second portion, wherein the baffle includes a first surface toward the clockwise direction that extends downwardly toward the lower end of the baffle wall, and a second surface toward the counter clockwise direction that extends downwardly toward the lower end of the baffle wall, wherein the diverter and the baffle direct the first portion and the second portion of the stream of liquid in the respective circumferential direction and an axial direction.

38. The floor cleaner of claim 11, wherein the recovery tank includes a strainer disposed beneath the baffle positioned to receive liquid dropping from the baffle wall.

39. The floor cleaner of claim 11, wherein the recovery tank sidewall forms a central axis extending between the bottom portion and the top portion, wherein the baffle axis is disposed along the central axis.

40. The floor cleaner of claim 21, further comprising a base movable along a surface to be cleaned and an upright portion coupled to the base, the upright portion movable between an inclined use position and an upright storage position.

41. The floor cleaner of claim 40, wherein the recovery tank is disposed on the upright portion.

* * * * *